United States Patent
Morris et al.

(10) Patent No.: US 9,805,124 B2
(45) Date of Patent: Oct. 31, 2017

(54) AUTOMATIC GENERATION OF A COLLECTION OF CONTENT

(71) Applicant: Microsoft Technology Licensing, LLC, Redmond, WA (US)

(72) Inventors: Katrika Morris, Issaquah, WA (US); Lauren Javor, Seattle, WA (US); Kami Neumiller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 520 days.

(21) Appl. No.: 13/869,988

(22) Filed: Apr. 25, 2013

(65) Prior Publication Data

US 2014/0324902 A1 Oct. 30, 2014

(51) Int. Cl.
*G06F 17/30* (2006.01)

(52) U.S. Cl.
CPC .. *G06F 17/30867* (2013.01); *G06F 17/30696* (2013.01); *G06F 17/30873* (2013.01)

(58) Field of Classification Search
CPC ................................. G06F 17/30867
See application file for complete search history.

(56) References Cited

U.S. PATENT DOCUMENTS

| | | | |
|---|---|---|---|
| 6,065,001 A * | 5/2000 | Ohkubo | G06F 17/3071 707/700 |
| 7,502,831 B1 | 3/2009 | Macias et al. | |
| 8,275,880 B2 | 9/2012 | Allard et al. | |
| 9,218,392 B1 * | 12/2015 | Zgraggen | G06F 17/30699 |
| 2004/0012627 A1 | 1/2004 | Zakharia et al. | |
| 2006/0041562 A1 * | 2/2006 | Paczkowski | G06F 17/30884 |
| 2007/0033169 A1 * | 2/2007 | Friedman | G06F 17/30551 |
| 2007/0033171 A1 | 2/2007 | Trowbridge | |
| 2007/0061755 A1 | 3/2007 | Taboada et al. | |
| 2007/0162424 A1 * | 7/2007 | Jeh | G06F 17/30867 |
| 2007/0203898 A1 * | 8/2007 | Carmona | G06F 17/30997 |
| 2007/0235528 A1 * | 10/2007 | Spencer | G06Q 10/087 235/383 |
| 2007/0288247 A1 * | 12/2007 | Mackay | G06Q 10/00 705/1.1 |
| 2008/0235608 A1 | 9/2008 | Prabhu | |
| 2008/0281794 A1 * | 11/2008 | Mathur | G06F 17/3089 |
| 2009/0164433 A1 * | 6/2009 | R. | G06F 17/30867 |
| 2009/0282021 A1 * | 11/2009 | Bennett | G06F 17/30648 |
| 2009/0292696 A1 * | 11/2009 | Shuster | G06F 17/30867 |
| 2010/0031169 A1 | 2/2010 | Jang et al. | |

(Continued)

FOREIGN PATENT DOCUMENTS

WO WO2012139200 A1 10/2012

OTHER PUBLICATIONS

PCT Demand for International Application No. PCT/US2014/035058, date of filing: Apr. 23, 2014, 21 pages.

(Continued)

*Primary Examiner* — Syed Hasan
(74) *Attorney, Agent, or Firm* — Christopher R. Christensen; Kelly, Holt & Christenson PLLC

(57) ABSTRACT

A content collection system receives a natural language input and identifies a type of content to be collected based on the natural language input. Items of content from multiple different digital media types are collected from a plurality of different sources and organized in an order.

20 Claims, 31 Drawing Sheets

(56) References Cited

U.S. PATENT DOCUMENTS

| | | | |
|---|---|---|---|
| 2010/0049802 A1* | 2/2010 | Raman | G06F 17/30867 709/204 |
| 2011/0153605 A1 | 6/2011 | Silverman | |
| 2011/0154183 A1* | 6/2011 | Burns | G06F 17/30899 715/234 |
| 2011/0191314 A1* | 8/2011 | Howes | G06Q 30/02 707/706 |
| 2011/0202827 A1 | 8/2011 | Freishtat et al. | |
| 2012/0047025 A1* | 2/2012 | Strohman | G06F 17/3064 705/14.71 |
| 2012/0266057 A1 | 10/2012 | Block et al. | |
| 2013/0060763 A1* | 3/2013 | Chica | G06F 17/30699 707/723 |
| 2013/0159823 A1 | 6/2013 | Ri et al. | |
| 2013/0198632 A1 | 8/2013 | Hyman | |
| 2013/0275892 A1 | 10/2013 | Li et al. | |
| 2013/0318177 A1* | 11/2013 | Tan | H04L 51/28 709/206 |
| 2013/0326350 A1 | 12/2013 | Roberts et al. | |
| 2013/0335455 A1 | 12/2013 | Rooke et al. | |
| 2014/0122990 A1 | 5/2014 | Puppin | |

OTHER PUBLICATIONS

Zite., "Zite Under the Hood", Retrieved at <<http://blog.zite.com/2012/01/11/zite-under-the-hood/>>, Jan. 27, 2013, pp. 5.

Corner, Matthew., "Tumblr: An Introduction Guide for Microblogging Part 1", Retrieved at http://www.1stwebdesigner.com/design/tumblr-introduction-guide-microblogging/>>, Jan. 29, 2013, pp. 20.

"Oracle Syndication Server User's and Administrator's Guide", Retrieved at <<http://docs.oracle.com/cd/A97630_01/appdev.920/a88787.pdf>>, Jun. 2001, pp. 78.

Ingram, Mathew., "Storify Wants to Pull Stories From the Stream", Retrieved at <<http://gigaom.com/2010/09/29/storify-wants-to-pull-stories-from-the-stream/>>, Sep. 29, 2010, pp. 6.

Paris, et al., "Focused and Aggregated Search: A Perspective from Natural Language Generation", Retrieved at <<http://citeseerx.ist.psu.edu/viewdoc/download?doi=10.1.1.174.6807&rep=rep1&type=pdf>>, In Journal of Information Retrieval, vol. 13, Issue 5, Oct. 2010, pp. 26.

"Techniques for Aggregating List and Site Information", Retrieved at <<http://msdn.microsoft.com/en-us/library/ff649417.aspx>>, May 24, 2010, pp. 3.

Second Written Opinion for International Application No. PCT/US2014/035058, dated May 27, 2015, date of filing: Apr. 23, 2014, 7 pages.

International Search Report and Written Opinion from International Application No. PCT/US2014/035058, dated Aug. 27, 2014, Date of Filing: Apr. 23, 2014. 11 pages.

Mayu Iwata et al.: "AspecTiles:Tile-based Visualization of Diversified Web Search Results", Research and Development in Information Retrieval from Aug. 12, 2012, pp. 85-94(10 pages).

Fabian Abel et al.: "Leveraging the Semantics of Tweets for Adaptive Faceted Search on Twitter", The Semantic Web A ISWC 2011, Oct. 23, 2011, pp. 1-17 (17 pages).

Final Office Action for U.S. Appl. No. 13/870,975 dated Dec. 3, 2015, 38 pages.

* cited by examiner

AUTOMATIC GENERATION OF A COLLECTION OF CONTENT

BACKGROUND

Computer systems are currently in wide use. They are deployed for use in a wide variety of environments. One environment is for performing on-line research.

Research is the process of obtaining information to become informed on any subject. For instance, research can be done for a school project or a work project. It can also be done to compare products in order to buy a given brand of product. Similarly, one can do research when planning a vacation or an event (such as a wedding or a birthday, etc.) or when simply following a personal interest or hobby. Research can even be used when looking for a good article or a good book to read or even when trying to find a good restaurant. Performing on-line research in these and other areas can present some challenges.

Even after the information is obtained through the research process, collection, sifting through, and organizing different sources of information can be quite time consuming. It is very unlikely that a single source will contain all the desired information. Instead, information from different sources often overlaps or forms an incomplete picture of the subject being researched. This can cause the user to have to sort through many redundant sources. In addition, the sources are often presented in a way in which there is no logical order to consume the information. Instead, content items are simply provided to the user as a string of independent items of content.

In addition, the time available for consuming the located content can be a factor as well. If the user wishes to become informed on a certain subject matter area in an hour, the content located and returned to the user might be quite different than if the user has a week, or even a year, within which to become informed on the subject matter area.

Some current systems allow a user to declare an area of interest. These systems then provide a stream of reading material that is hopefully related to the declared subject matter of interest. However, the problems discussed above with respect to research, organization, and consumption of the content are not addressed.

The discussion above is merely provided for general background information and is not intended to be used as an aid in determining the scope of the claimed subject matter.

SUMMARY

A content collection system receives a natural language input and identifies a type of content to be collected based on the natural language input. Items of content from multiple different digital media types are collected from a plurality of different sources and organized in an order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
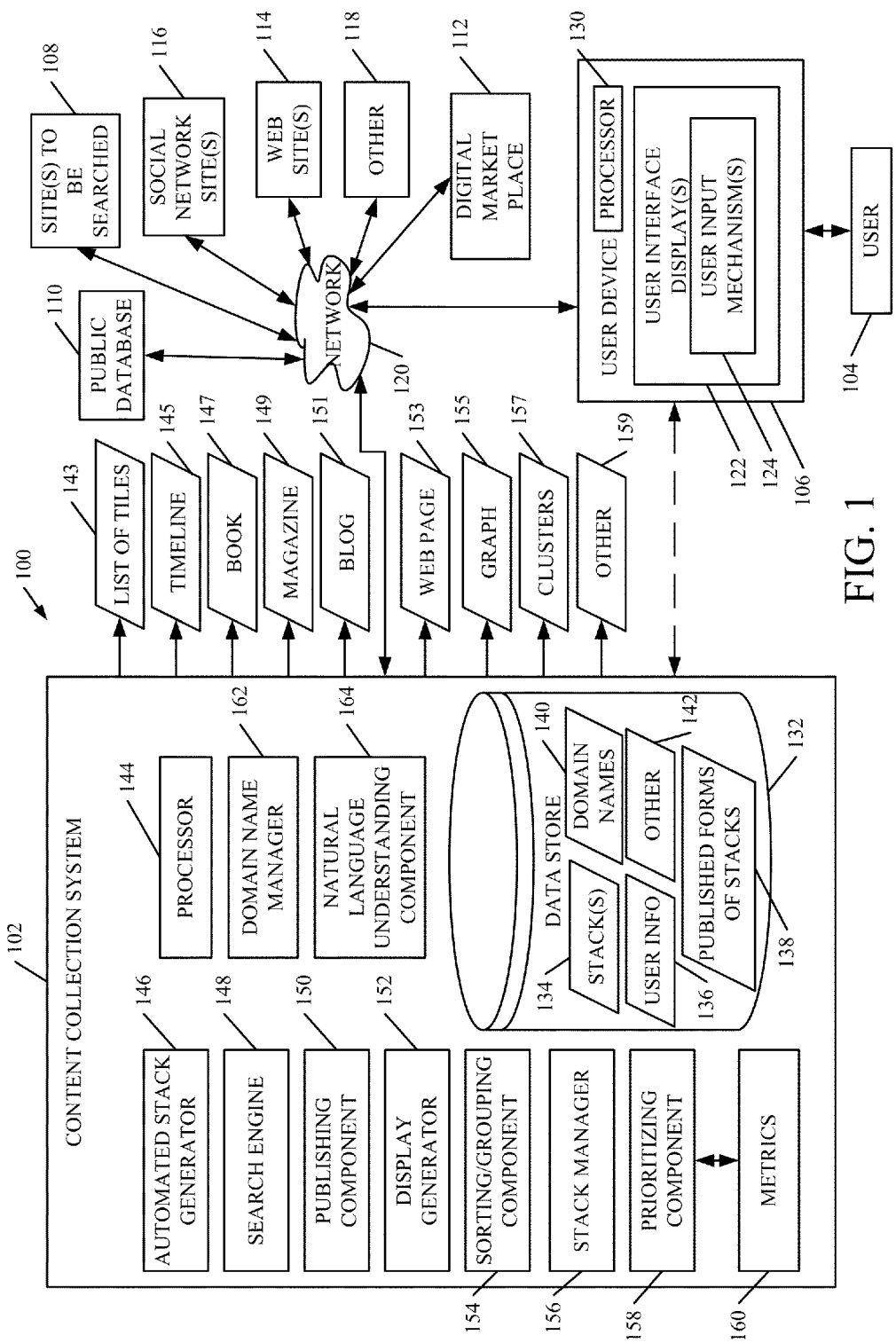
FIG. 1 is a block diagram of one illustrative research architecture.

FIG. 1 is a block diagram of one embodiment of a research architecture 100. Architecture 100 shows a content collection system 102 accessible by a user 104 using a user device 106. In doing so, user 104 controls content collection system 102 to collect content from sites to be searched 108, public databases 110, digital marketplaces 112, various other websites 114, social network sites 116 and other areas 118. This can illustratively be done over a network 120, which can be a wide area network, a local area network, or any other type of network.

In the embodiment shown in FIG. 1, user device 106 generates user interface displays 122 with user input mechanisms 124 for interaction by user 104. User 104 illustratively interacts with the user input mechanisms 124 in order to control and manipulate content collection system 102, as well as user device 106.

The user input mechanisms 124 can take a wide variety of different forms. For instance, they can be links, buttons, icons, tiles (which not only operate as links to content but dynamically display information about the underlying content as well), text boxes, dropdown menus, check boxes, or any of a wide variety of different user input mechanisms. In addition, the user input mechanisms 124 can be actuated in a wide variety of different ways. For instance, they can be actuated using a point and click device (such as a mouse or track ball), using a hard or soft keyboard or keypad, a thumbpad, buttons, joysticks, etc. Similarly, where the particular user device 106 on which the user input mechanisms 124 are displayed include speech recognition components, the user input mechanisms 124 can be actuated using speech commands. Also, where the user interface displays 122 are displayed on a touch sensitive screen, the user input mechanisms 124 can be actuated using touch gestures, such as with the user's finger, a stylus, or another mechanism.

User device 106 illustratively includes a processor 130. Processor 130 is illustratively a computer processor with associated memory and timing circuitry (not separately shown). It is a functional part of user device 106 and is activated by various components on the user device to facilitate the functionality of the user device 106. Multiple processors can be used as well.

Content collection system 102 illustratively includes data store 132 that includes stacks (or collections of content) 134, user information 136, published forms of stacks 134 (designated by numeral 138) domain names 140, and other information 142. Data store 132 is shown as a single data store. It will be noted, however, that multiple different data stores can be used. They can be local to system 102 or remote from system 102, and accessible by system 102. Similarly, some can be local while others are remote.

Content collection system 102 is also shown having processor 144, automated stack generator 146, search engine 148, publishing component 150, display generator 152, sorting/grouping component 154, stack manager 156, prioritizing component 158 that accesses priority metrics 160, domain name manger 162 and natural language understanding (NLU) component 164. Of course, system 102 can have fewer or other components as well.

Processor 144 is illustratively a computer processor with associated memory and timing circuitry (not separately shown). It is illustratively a functional part of content collection system 102 and is activated by, and facilitates the functionality of, other items in content collection system 102. In addition, while only a single processor 144 is shown, multiple processors can be used as well, and they can be located within system 102 or external to system 102.

In addition, FIG. 1 shows a number of different blocks with corresponding functionality. It will be noted that the functionality of two or more blocks can be combined into a single block, or the functionality can be divided into additional blocks as well. Those shown are for the sake of example only.

Prior to providing a more detailed discussion of the operation of architecture 100, a brief overview will be provided for the sake of clarity. In the embodiment discussed, user 104 wishes to begin a collection (or stack) of content. User 104 can illustratively provide a natural language user input query through one of user input mechanisms 124 to begin data collection (of items of content) to fill the stack. Natural language understanding component 164 interprets the query and automated stack generator 146 uses search engine 148 to identify content related to the query, and accesses the content from a variety of different sources. Sorting/grouping component 154 organizes the items of content in the stack into a given order and the stack 134 is filled with the content items, so they can be presented to user 104, shared by user 104 or published in a variety of forms by user 104.

The stacks can be output simply as a list of links or tiles 143, each link or tile representing an item in the stack. They can be output according to a timeline 145 that shows when the items of content were authored, published or another date. They can be formatted as a book 147 with a table of contents or as a magazine 149. They can also be formatted as blog 151, as another type of webpage 153, they can be shown along a graph 155, the contents can be clustered into clusters 157 or they can be output in other forms 159. These are described in greater detail below.

Figure 2A:
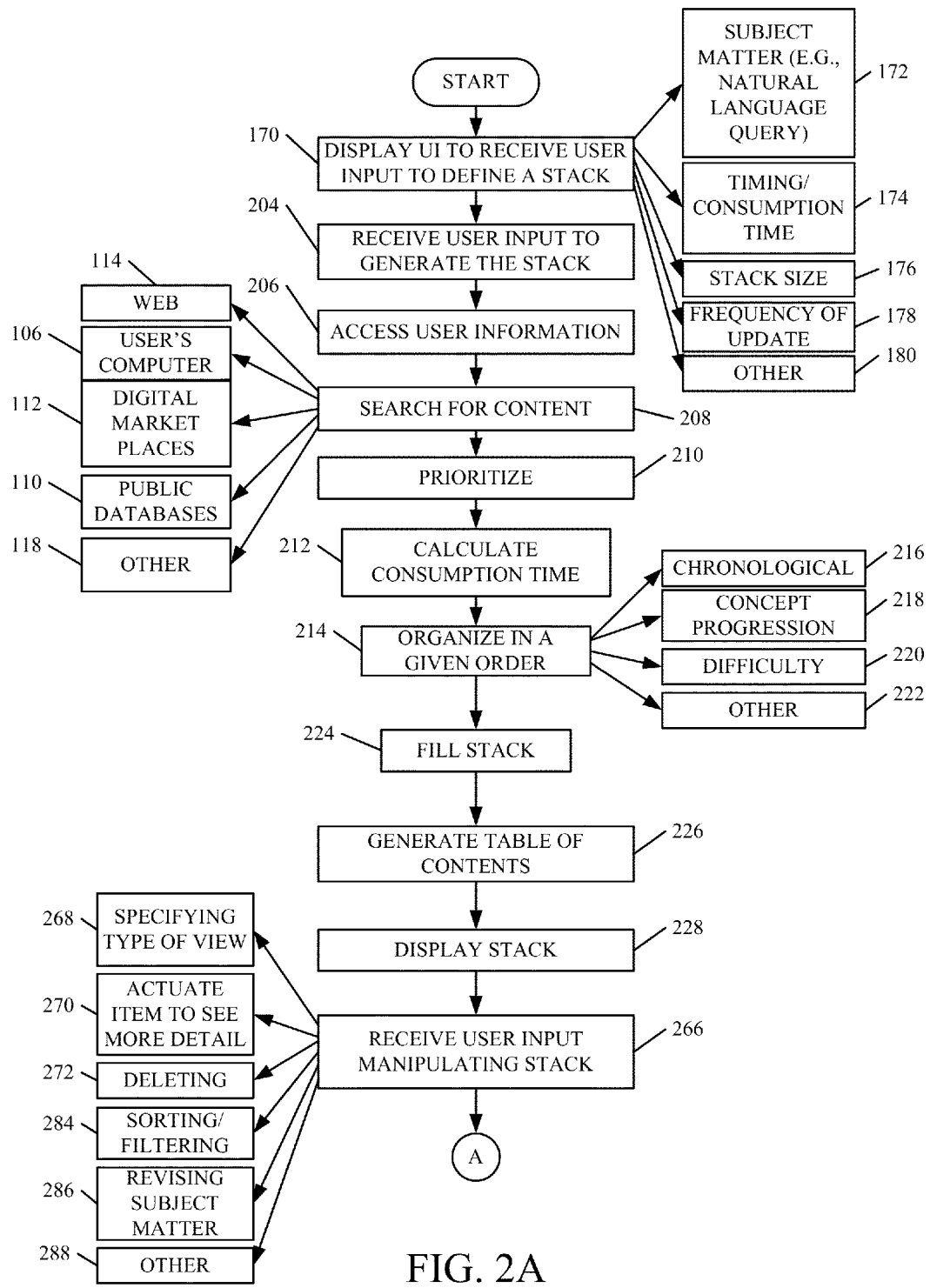
FIGS. 2A and 2B (collectively FIG. 2) show a flow diagram illustrating one embodiment of the operation of the architecture shown in FIG. 1.
Figure 2B:
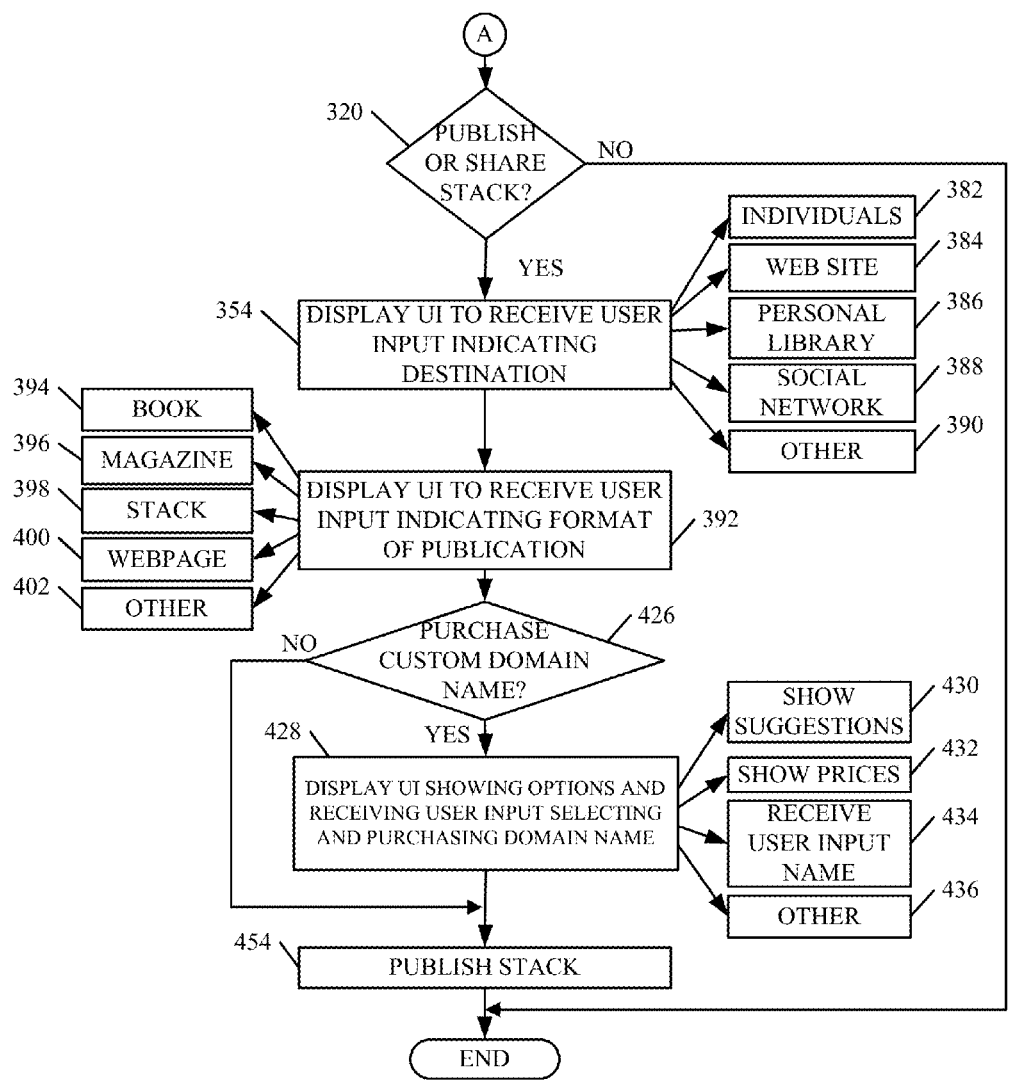
Figure 3A:
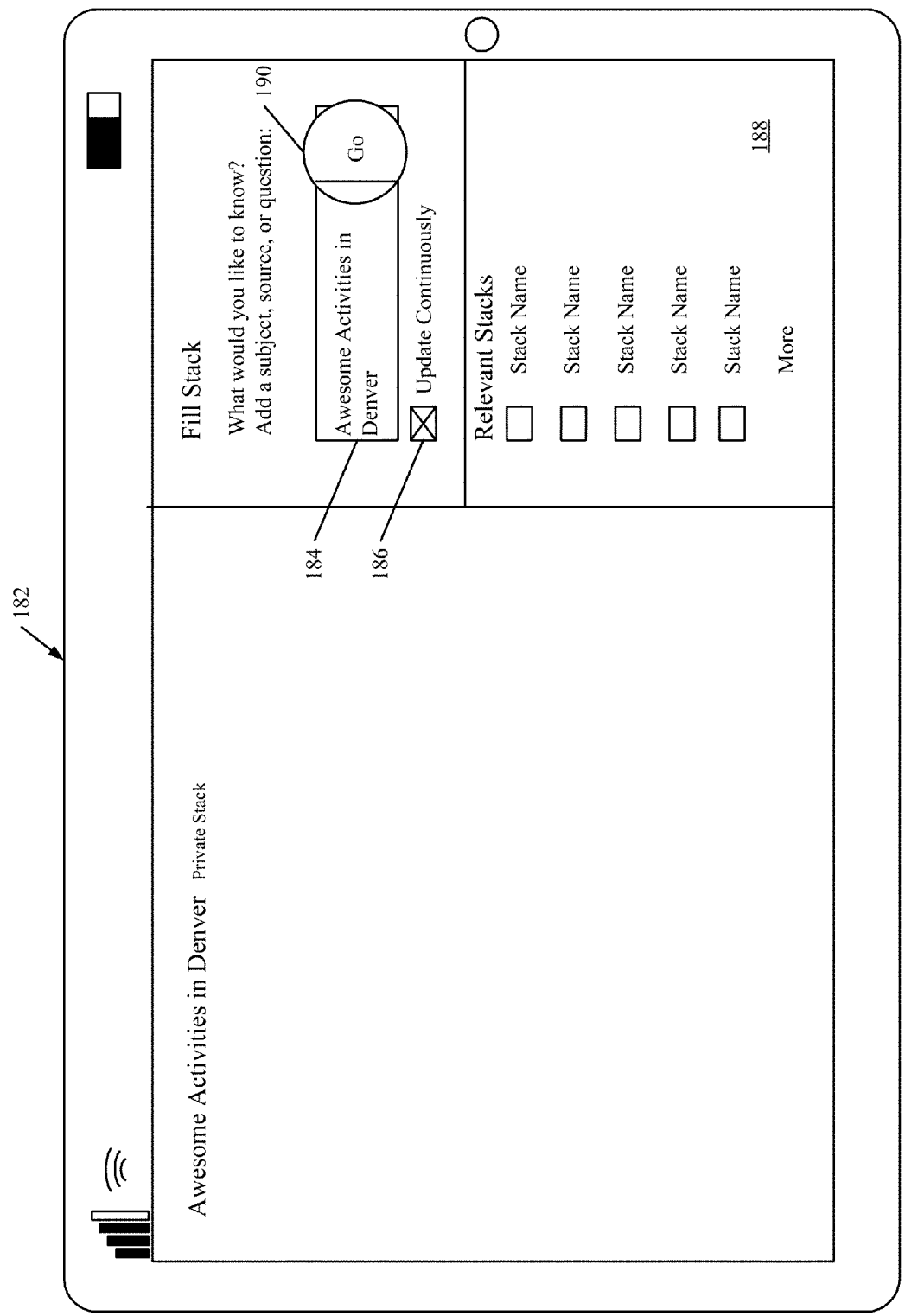
FIGS. 3A-3R show exemplary user interface displays.
Figures 1, 3A:
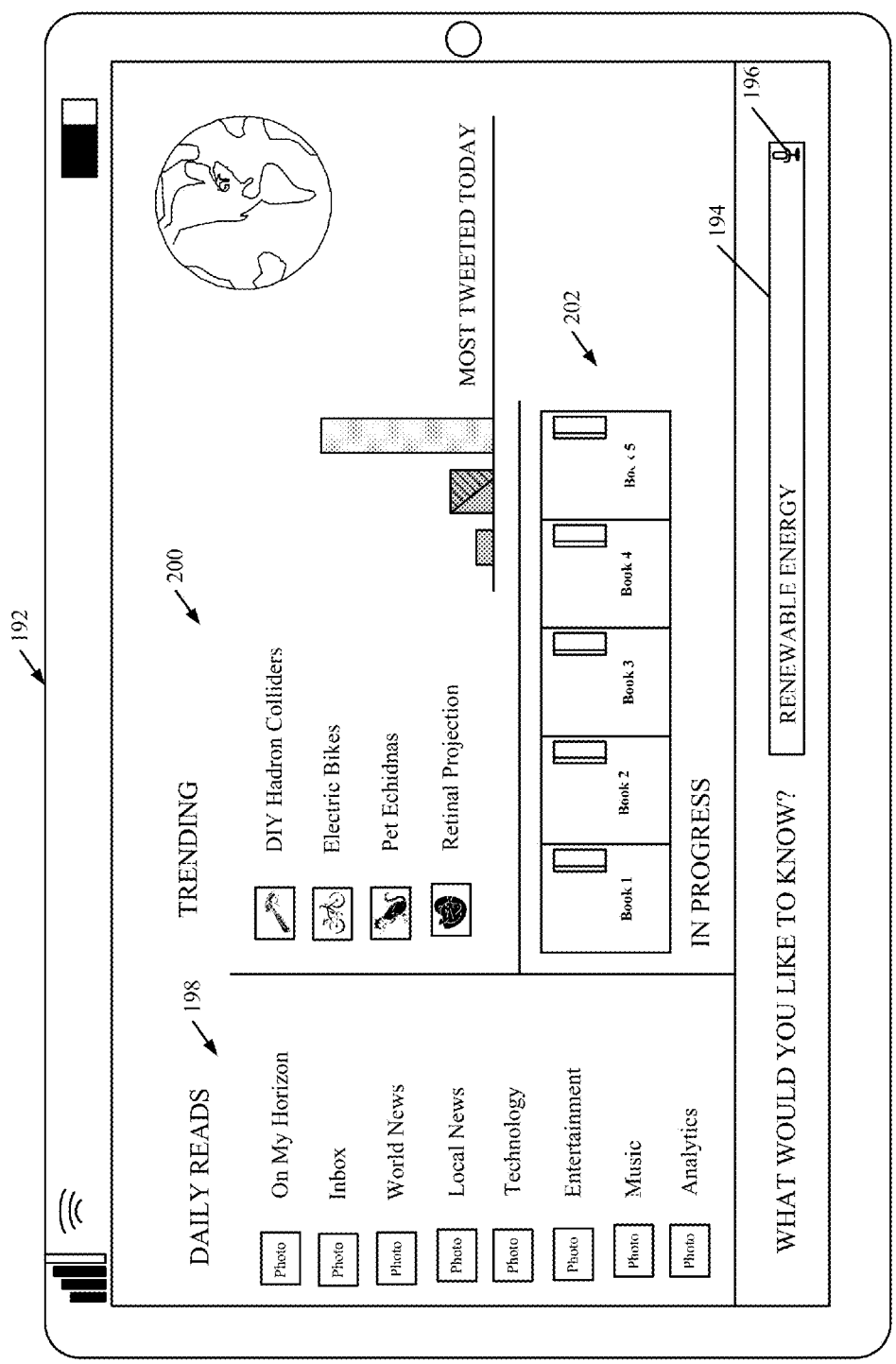
Figures 2, 3A:
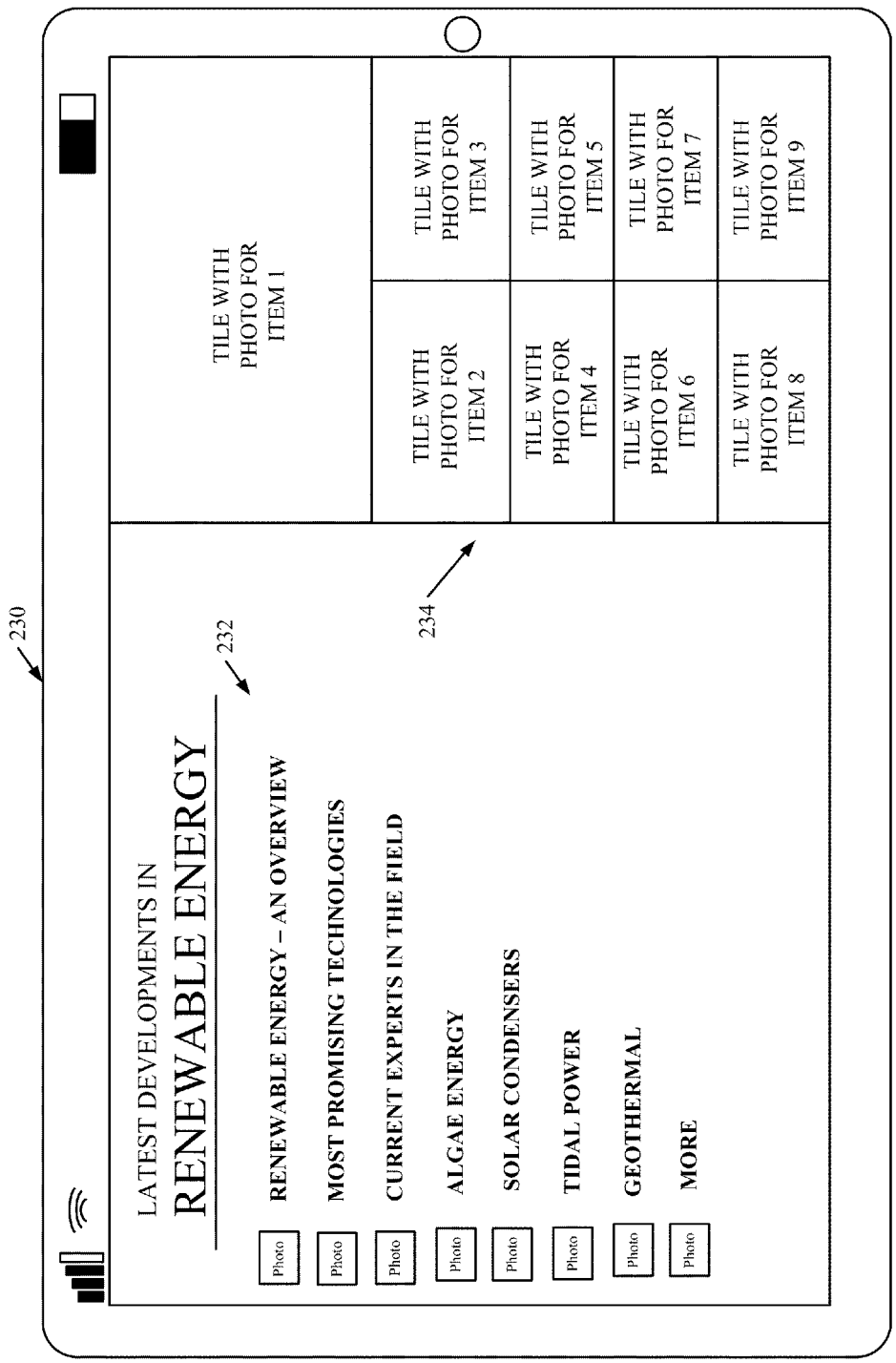

FIGS. 2A and 2B (collectively referred to as FIG. 2) show a flow diagram illustrating one embodiment of the operation of architecture 100 generating a stack 134 of content, in more detail. FIGS. 3A-3R are illustrative user interface displays. FIGS. 2-3R are now described in conjunction with one another.

In order to begin generating a stack, automated stack generator 146 illustratively displays a user interface display with user input mechanisms that receive user inputs to define the stack to be created. This is indicated by block 170 in FIG. 2. By way of example, the user interface display can be provided with a user input mechanism 124 to receive a subject matter query (such as a natural language query 172). It can also receive a timing input that the user inputs, that defines a time period within which the user wishes to have content in the stack generated and/or the total consumption time for the stack. For instance, it may be that the user wishes the stack to be generated in the next 30 minutes and does not want the total consumption time (the time needed for the user to read or consume all items of content in the stack) to exceed one hour. The timing/consumption time is indicated by block 174. Also, in one embodiment, user 104 can specify a stack size, in terms of the number of items the user wishes to include in the stack. The stack size is indicated by block 176. User 104 can also illustratively specify a frequency with which the stack is to be updated (such as daily, hourly, continuously, or otherwise). The frequency of update is indicated by block 178. Of course, user 104 can provide other or additional information as well, as indicated by block 180.

A natural language query can also contain all of this information. The following are examples of four natural language queries that illustrate this.

"What's new in renewable energy in the last 3 years?"

"I'm going to Denver this weekend and I am looking for activities that my 6 year old son would love."

"I have a week to become an expert in molecular biology and I haven't taken a biology class since $10^{th}$ grade."

"I want an overview of the different areas of biotech in 1 hour."

These examples show that the query can have a timing component that requires some knowledge about the age of documents, what if means to be a 6 year old, how long it would take to consume content, etc. These are all processed by NLU component 164 to obtain an interpretation that can be used to identify relevant items of content.

FIGS. 3A and 3A-1 show user interface displays for defining a new stack. FIG. 3A shows one embodiment of a user interface display 182. User interface display 182 provides a text box 184 that allows the user to type in a natural language query. Display 182 also includes a check box 186 that allows the user to specify that the stack is to be updated continuously. User interface display 182 also shows that, based upon the user's query in text box 184, a number of other, relevant, and already-existing stacks are displayed in relevant stacks display pane 188. Therefore, each of the already-existing stacks is illustratively represented in pane 188 by an actuatable input mechanism (such as a link or icon). When the user actuates one of the links or icons for an already existing stack in pane 188, the user is illustratively navigated to that stack to review its content. User interface display 182 also illustratively includes a "go" button 190. When the user actuates the go button 190, automated stack generator 146 begins identifying content that can be included in the new stack. This is described in greater detail below.

FIG. 3A-1 shows another embodiment of a user interface display 192 that allows the user to begin a new stack. User interface display 192 illustratively includes a query input box 194. By clicking in the box 194, the user can type in the box, just like a text box. However, by clicking on microphone indicator 196, the user can simply speak a natural language query, and speech recognition components in content collection system 102 recognize the speech and fill in the words in box 194.

FIG. 3A-1 also shows that user interface 192 includes a daily reads section 198 which illustratively displays various stacks or collections or other sources of content that are updated daily, and read by user 104. Similarly, user interface display 192 includes a trending section 200 that shows various subject matter areas that are trending on social network sites, news network sites, or other sites, that can be related to the user's natural language input query. Similarly, user interface display 192 has an in progress section 202 that shows the various books or stacks that are currently in progress for user 104. FIGS. 3A and 3A-1 are only two examples of user interface displays that can be generated for user 104 to begin a new stack.

System 102 then illustratively receives a user input that automated stack generator 146 is to generate the new stack. In the embodiment shown with respect to FIG. 3A, this corresponds to the user clicking go button 190. Receiving the user input to begin generating the new stack is indicated by block 204 in FIG. 2.

Automated stack generator 146 then accesses user information 136 in data store 132 in order to enhance the natural language query. For instance user information 136 may include profile information indicative of a user's interests. It may include lists of items the user has already reviewed, etc. In any case, accessing the user information is indicated by bock 206 in FIG. 2. Automated stack generator 146 then uses search engine 148 to search for content. This is indicated by block 208 in FIG. 2. In doing so, automated stack generator 146 can use search engine 148 to search websites 114, the user's own computer (such as on user device 106), public marketplaces 112, public databases 110, social networks 116, or other sources 118.

It should be noted that, in one embodiment, the content for the stack can be items of multiple different digital media types. For instance, they can be documents, videos, websites or website addresses, images, digital books, periodicals, free content, links to paid content, or overviews of paid content, etc.

Once the items of content have been located, automated stack generator 146 illustratively uses prioritizing component 158 in order to prioritize the items as indicated by block 210 in FIG. 2. In doing so, prioritizing component 158 illustratively accesses publicly available metrics, the user information 136, or other metrics 160. The metrics can include a wide variety of priority ranking metrics, such as the search engine ranking from search engine 148, the date that the content was authored, any social network ratings or other ratings assigned to the content, the number of citations to the content or links to or from the content, etc. In addition, the content can be prioritized by component 158 based on other information, such as the user's knowledge in certain domains (reflected by the content contained on the user's computer or content previously reviewed by the user), the user's personal interests reflected in user information 136, other people in a social network corresponding to user 104, or the reading level of the user. This can be contained in the user's information 136 as well. For instance, if the user is searching for renewable energy as part of a fifth grade project, highly complicated content may be prioritized lower than if the user is an engineer researching renewable energy as part of a work project.

Automated stack generator 146 can then calculate the consumption time corresponding to each of the items of content. This can be done if, for example, the user has specified a consumption time at block 174 above, that indicates how much time the user has to consume the information. For instance, if the user only has an hour to consume the information prior to a meeting, then the consumption time of each item of content can be considered in identifying the particular content items that are to be included in the stack. Calculating the consumption time is indicated by block 212 in FIG. 2.

Automated stack generator 146 then uses sorting/grouping component 154 to order the items of content (or organize them) in a given order. This is indicated by block 214 in FIG. 2. For instance, the content can be arranged in chronological order 216, or in order of concept progression 218. The chronological order 216 can be determined by author date, publication date, or in other ways. The concept progression 218 can be determined by using natural language understanding component 164 to identify the subject matter content of the item of content. The items of content can be ordered according to concept progression by presenting the content that describes an overview of the subject matter being searched first and the content that has a more detailed discussion of that subject matter last.

The content can also be arranged according to difficulty 220. For instance, again using natural language understanding component 164, the technical difficulty of an item of content can be identified so that the less difficult material is presented first, and the material is presented in order of increasing difficulty.

Of course, the content can be arranged in other ways as well. This is indicated by block 222 in FIG. 2. Once the items of content have been prioritized, and ordered based on the consumption time (if specified), and also organized in a given order, then the stack (or collection) 134 is filled with the items of content by automated stack generator 146. This is indicated by block 224 in FIG. 2.

Automated stack generator 146 can then automatically generate a table of contents to the items of content in the stack 134. This is indicted by block 226 in FIG. 2.

Automated stack generator 146 then illustratively uses display generator 152 to generate a display of the items of content in the stack. This is indicated by block 228.

FIGS. 3A-2, 3B, 3C, and 3D show a variety of different user interface displays used to display the stack 134. FIG. 3A-2 shows one embodiment of a user interface display 230 generated to display a stack related to "renewable energy". Automated stack generator 146 has used sorting/grouping component 154 to group the content into groups, and generated a table of contents generally shown at 232, for the items in the stack. Using natural language understanding component 164, sorting/grouping component 154 illustratively identifies commonality in subject matter associated with each of the items in the stack, and generates them into groups, and then generates a title for each group. Component 154 also illustratively orders the groups according to the predetermined order discussed above and provides an output as table of contents 232. Each item in the table of contents 232 is illustratively associated with an actuatable link so that when the user actuates a link corresponding to one item in the table of contents, the user is navigated to a section of the stack corresponding to that group of content items.

Display 230 also illustratively includes a selectable tile section 234. Section 234 illustratively includes a set of tiles that not only display information corresponding to the underlying subject matter, but which also operate as links. Therefore, when user 104 actuates one of the tiles 234, the user is navigated to the underlying material which the tile represents. In the embodiment shown in display 230 in FIG. 3A-2, each tile corresponds to an item of content in the stack. Therefore, when the user actuates one of the tiles, the user is navigated to that particular item. Of course, the tiles in section 234 can represent other things as well. For instance, each tile can represent a different type of media content (such as videos, blogs, documents, etc). When the user actuates the tile, the user is thus navigated to all content items of that media type. Of course, the tiles can represent the groups or clusters corresponding to the table of contents, or other groups of content or clusters as well. The tiles can represent other things as well.

Figure 3B:
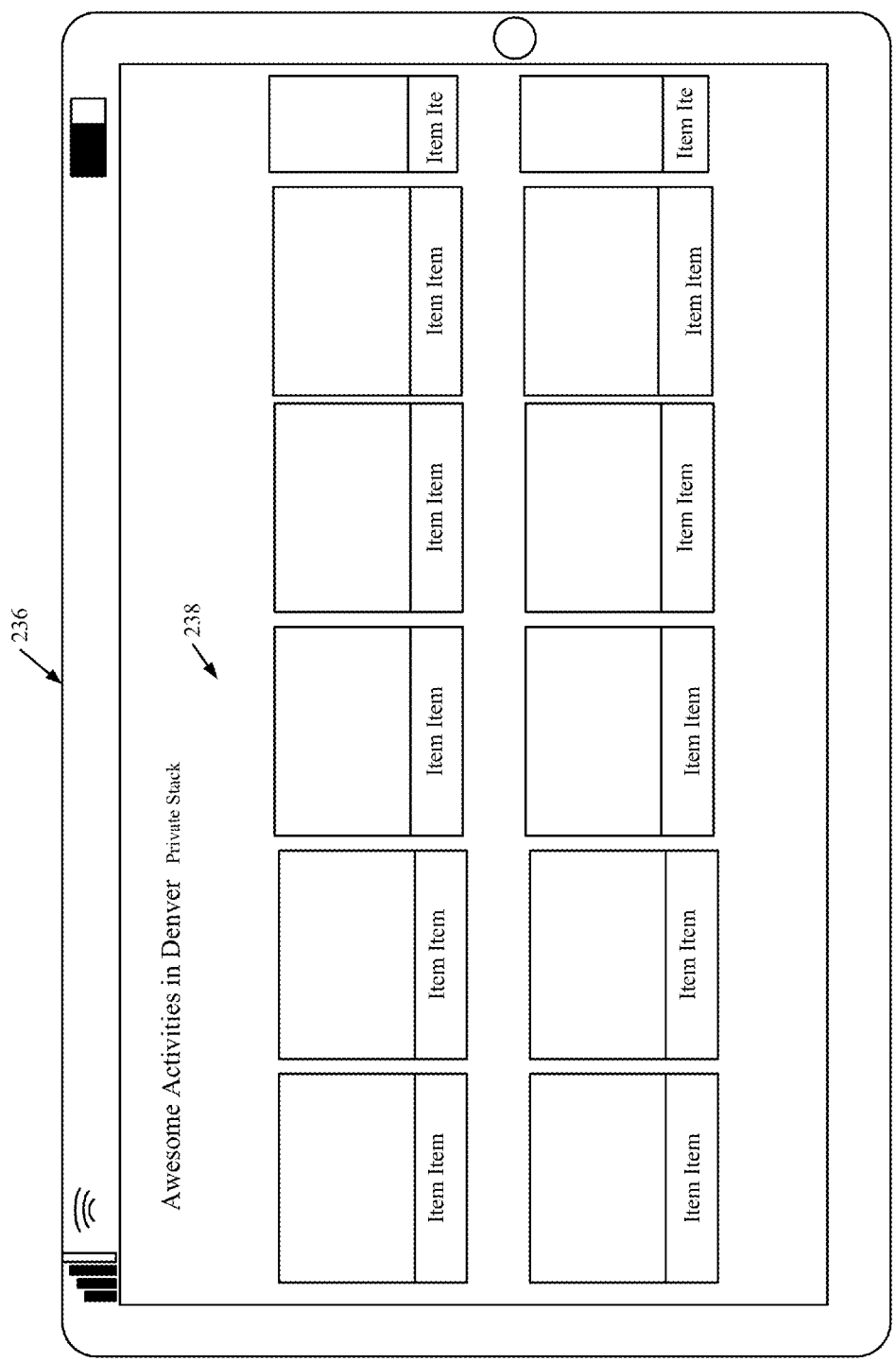

FIG. 3B shows one embodiment of another user interface display 236. In the embodiment shown in FIG. 3B, user interface display 236 displays the stack as a list 238 of tiles, where each tile corresponds to one item in the stack. If the list 238 is longer than can be displayed on a single user interface display, the list is illustratively scrollable. Therefore, if the display screen is a touch sensitive screen, the user can illustratively scroll the list 238 of tiles using touch gestures. Other scrollable mechanisms can be used as well. However, if the user actuates one of the tiles in list 238, the user is simply navigated to the underlying item of content in the stack so that the user can review it in detail. The tiles can be arranged in any of the orders discussed above, or in other orders as well.

Figure 3C:
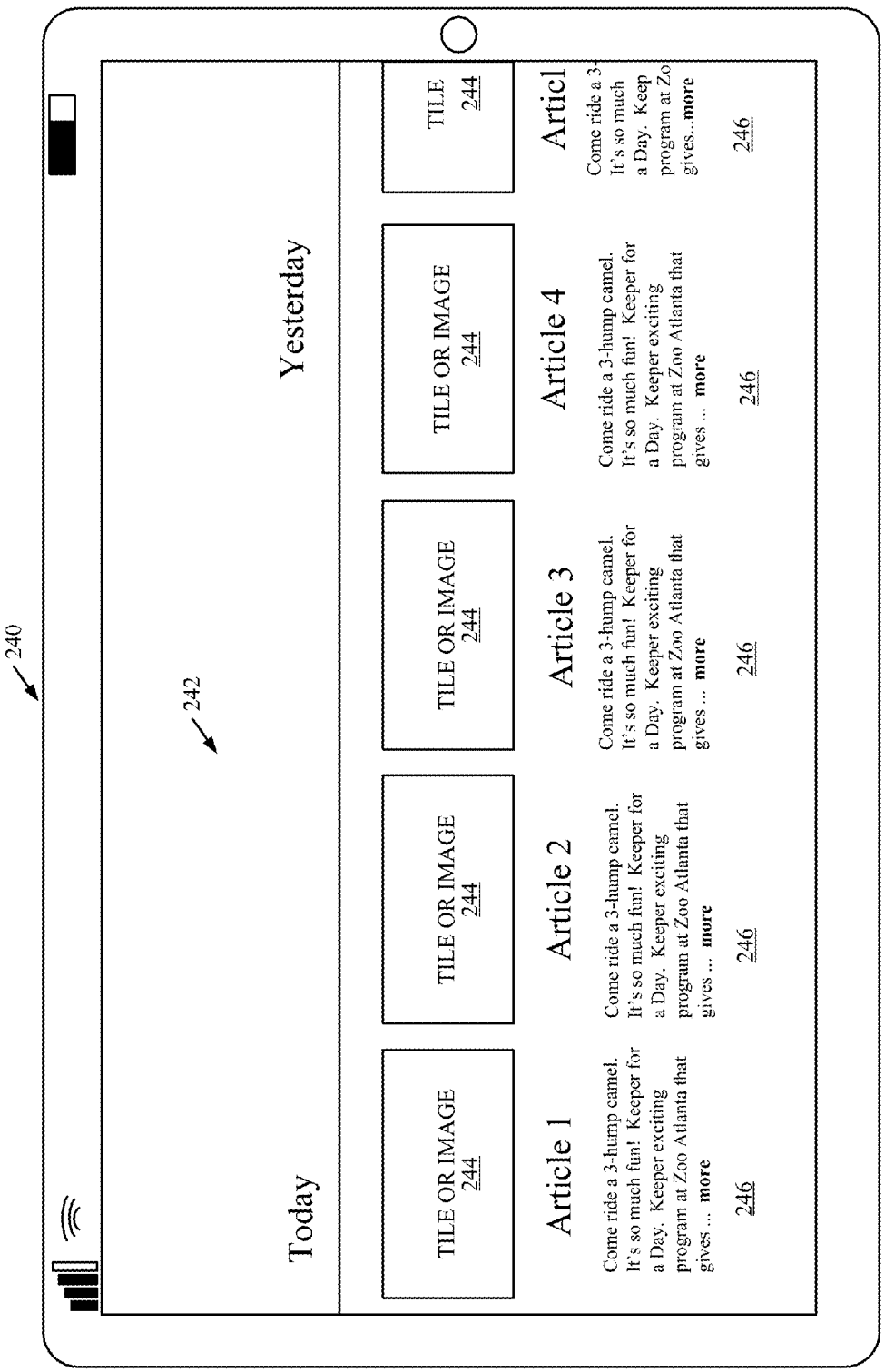

FIG. 3C shows one embodiment of another user interface display 240, in which each of the items on the stack is arranged according to a timeline 242. The timeline 242 shown in FIG. 3C is arranged according to the author date of each item in the stack. Each article (or item) in the timeline 242 has an associated tile 244. When the user actuates a given tile, the user is navigated to the underlying article (or item) in the stack. The user interface display 240 also shows that each item in the stack has a summary 246 generated therefore. The summary 246 can be automatically generated, or it can be extracted from the underlying item of content, or it can be generated in other ways as well.

Figure 3D:
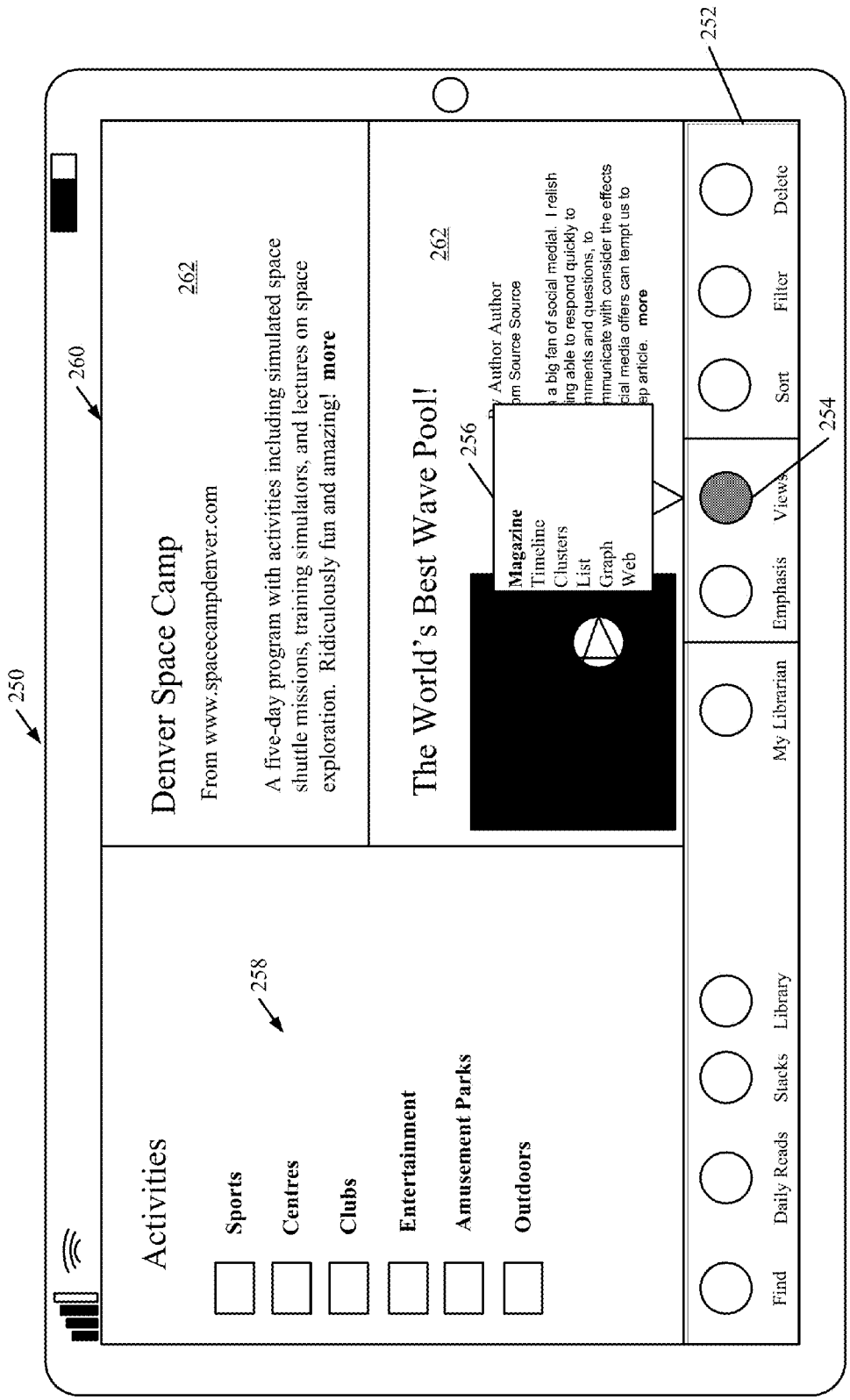

FIG. 3D shows yet another user interface display 250 that illustrates another way that the stack can be displayed. User interface display 250 illustratively includes a task bar 252 that can be invoked by the user, for example, using a touch gesture or another suitable user interface mechanism. The task bar includes a view button 254. When the user actuates the view button 254, the user can choose to view the stack in a number of different ways. A pop up menu 256 is generated that allows the user to select one of the various different types of views. As the user chooses one of the different view options in pop up menu 256, display generator 152 generates a display, displaying the stack in that view format. For instance, if the user selects "timeline" the timeline view of FIG. 3C is shown. If the user selects "list", the list view of FIG. 3B is shown, etc.

In user interface display 250, the stack is displayed generally in a magazine format, that includes an interactive table of contents 258 as well as scrollable section 260 that includes tiles 262, each of which includes a summary of a corresponding item of content. When the user actuates one of tiles 262 (such as by tapping on it on a touch sensitive screen) display generator 152 generates a view of the full version of the corresponding item of content.

Figure 3E:
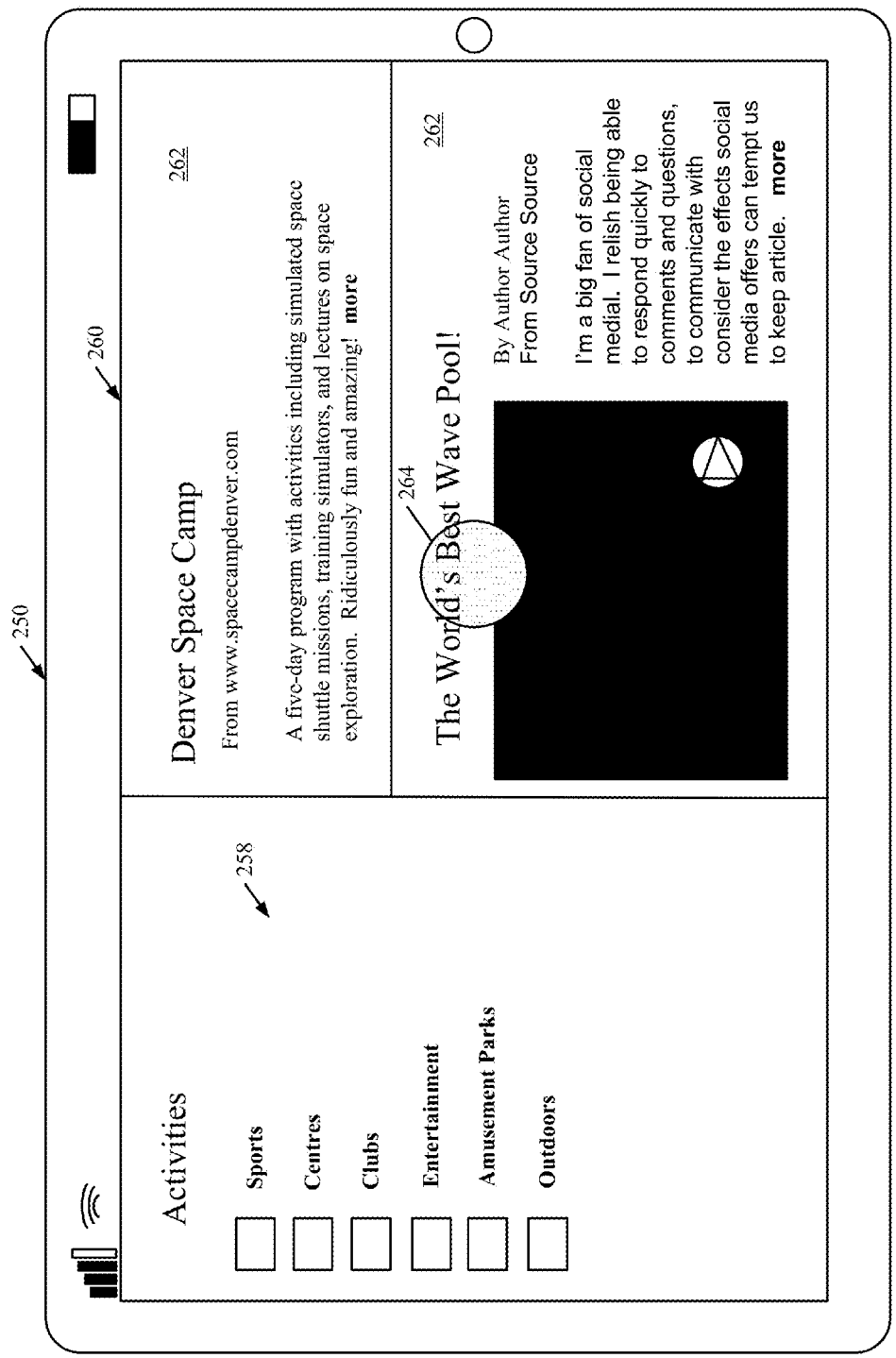

FIG. 3E illustrates this in more detail. For instance, FIG. 3E shows that the user has placed cursor 264, on tile 262 corresponding to "The world's best wave pool!" The user actuates cursor 264, then the entire article or item of content corresponding to that tile is displayed. In another embodiment, cursor 264 actually represents a user touch gesture (such as the user tapping on tile 262). In that embodiment, the full article or item of content is displayed as well. Of course, other ways for actuating a tile 262 can also be used.

Referring again to FIG. 2, user 104 (once the stack is displayed) can illustratively provide user inputs to manipulate the stack. This is indicated by block 266. The user can manipulate the stack in a wide variety of ways. For instance, as discussed above, the user can specify the type of view, as indicated by block 268 in FIG. 2. The user can of course actuate one of the items in the stack to see more detail, as indicated by block 270, or the user can delete an item as indicated by block 272.

Figure 3F:
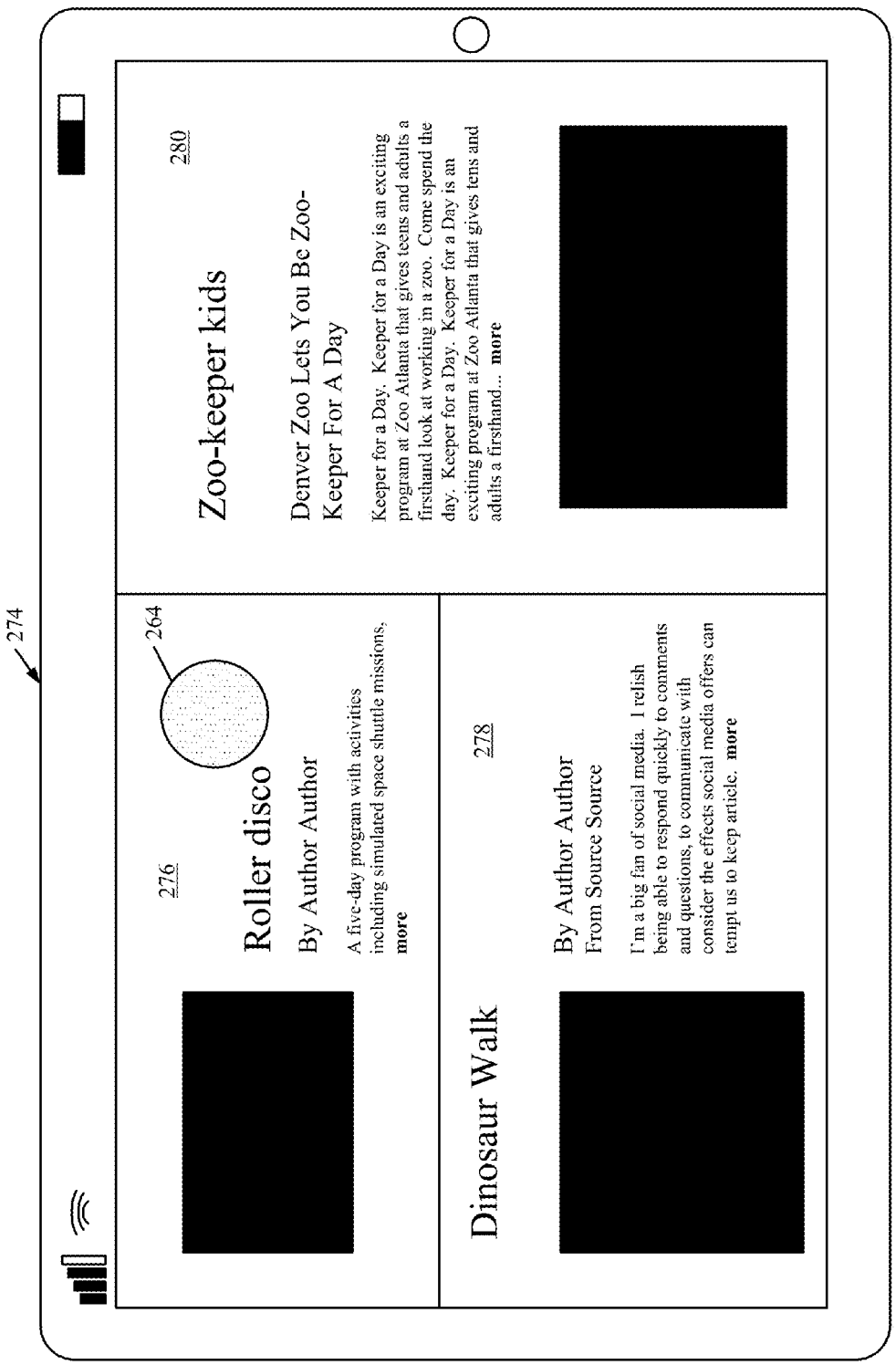
Figure 3G:
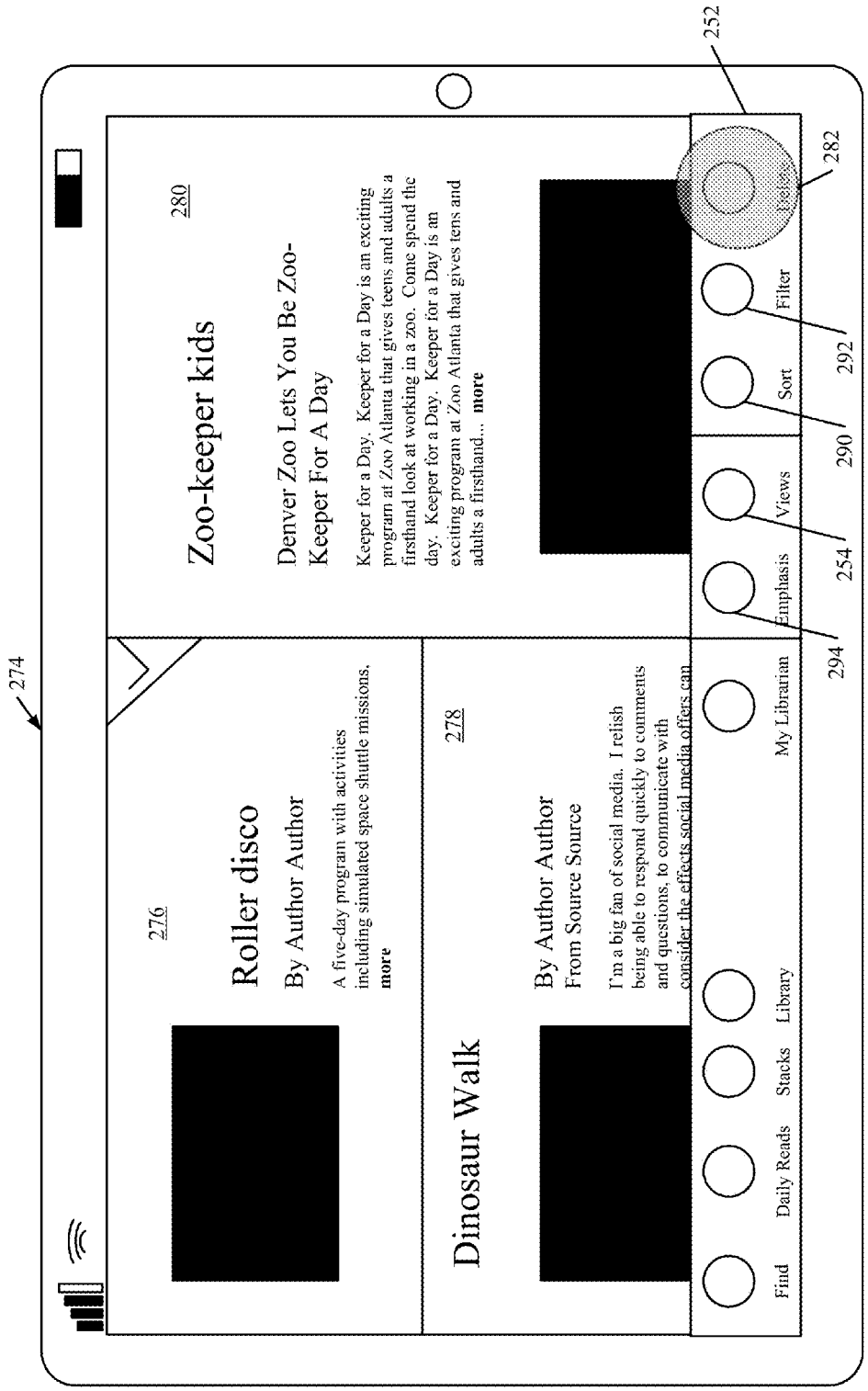

FIG. 3F shows one embodiment of user interface display 274 for deleting an item. User interface display 274 shows that the user is viewing the stack according to a given view where a plurality of different tiles 276, 278, and 280, are each displayed and each correspond to an underlying item of content. The user can actuate a tile (such as tile 276) by placing cursor 264 on the tile and actuating it, or with a touch gesture (such as by tapping tile 276). The user can then invoke the task bar 252 and actuate the delete button 282 to delete the selected tile 276. This is indicated in FIG. 3G. This will cause the underlying item 276 to be deleted from the stack 134.

Referring again to FIG. 2, the user can sort or filter the items in the stack, as indicated by block 204 or the user can revise the subject matter as indicated by block 286 or perform other stack management operations (using stack manager 156 shown in FIG. 1). Performing other operations is indicated by block 288 in FIG. 2. FIG. 3G shows that task bar 252 illustratively provides sort button 290 and a filter button 292. When the user actuates either button 290 or 292, a user interface display is generated that allows the user to sort based on predefined, or user input, criteria, or to filter items in the stack based on various other criteria as well.

Figure 3H:
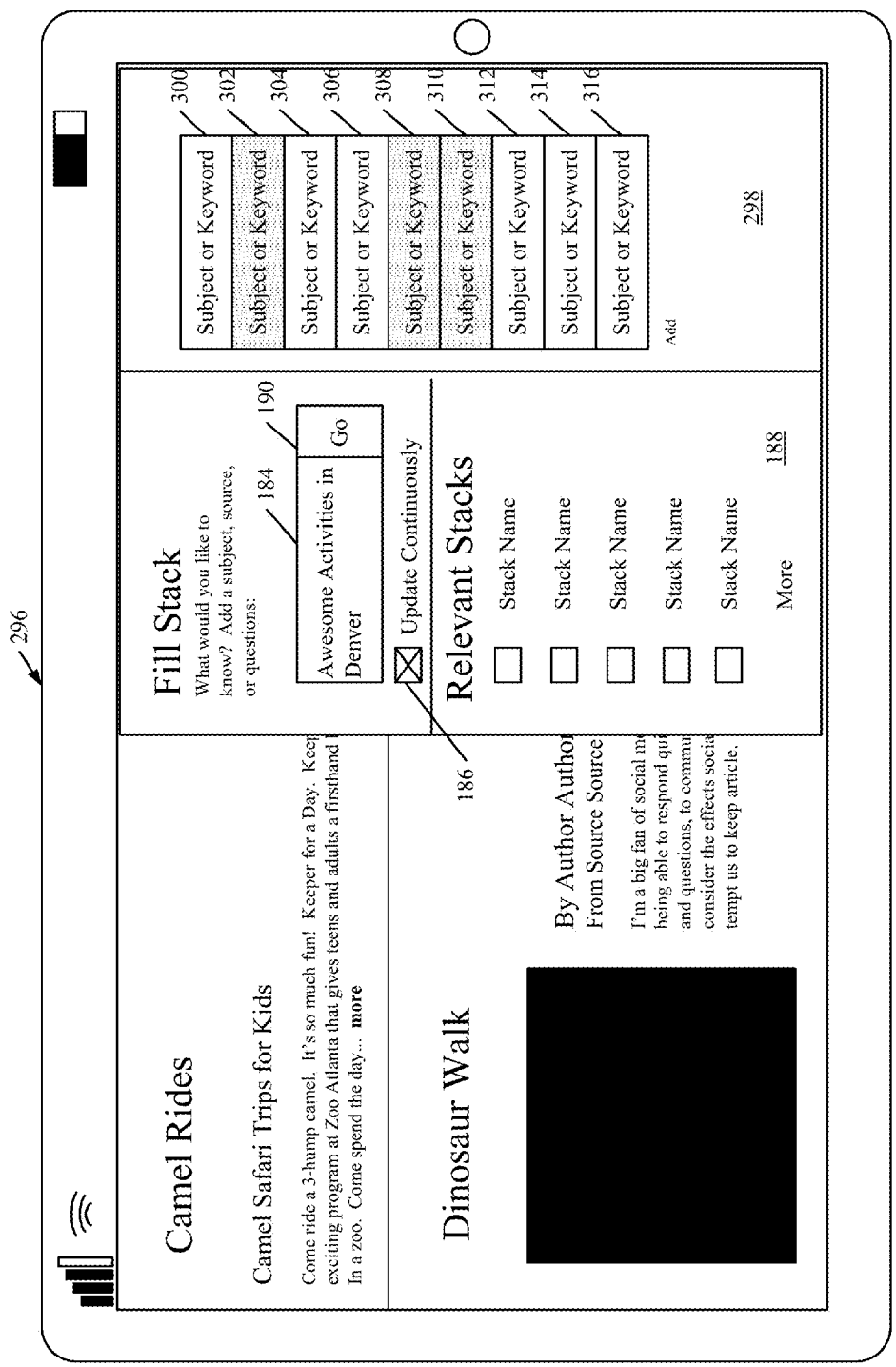

Task bar 252 also illustratively includes an emphasis button 294. When the user actuates the emphasis button, the user can illustratively revise the subject matter emphasized in identifying content items for the stack. In order to do this, stack manager 156 illustratively generates a user interface display, such as display 296 shown in FIG. 3H. FIG. 3H shows that the user has invoked a stack panel that includes some similar items to those shown in FIG. 3A, and they are similarly numbered. However, because the user has elected to modify the subject matter of the stack, a subject or keyword pane 298 is also displayed. Pane 298 includes a set of subject or keyword links (or boxes) 300-316. Stack manager 156 also highlights the particular subjects, categories, subcategories or keywords, that surfaced in this stack, based upon the natural language query input in box 184. It can be seen in user interface display 296, that subject or keyword buttons 302, 308 and 310 have been highlighted, indicating that they have been emphasized in the content of items in the stack. The user can illustratively select additional categories, and add them so that the stack is updated emphasizing those additional categories as well. Of course, the user can also select subject or category boxes 302, 308 or 310 and delete them so that the items of content that were added to the stack because of the categories in any of those deleted boxes are deleted from the stack.

Figure 3I:
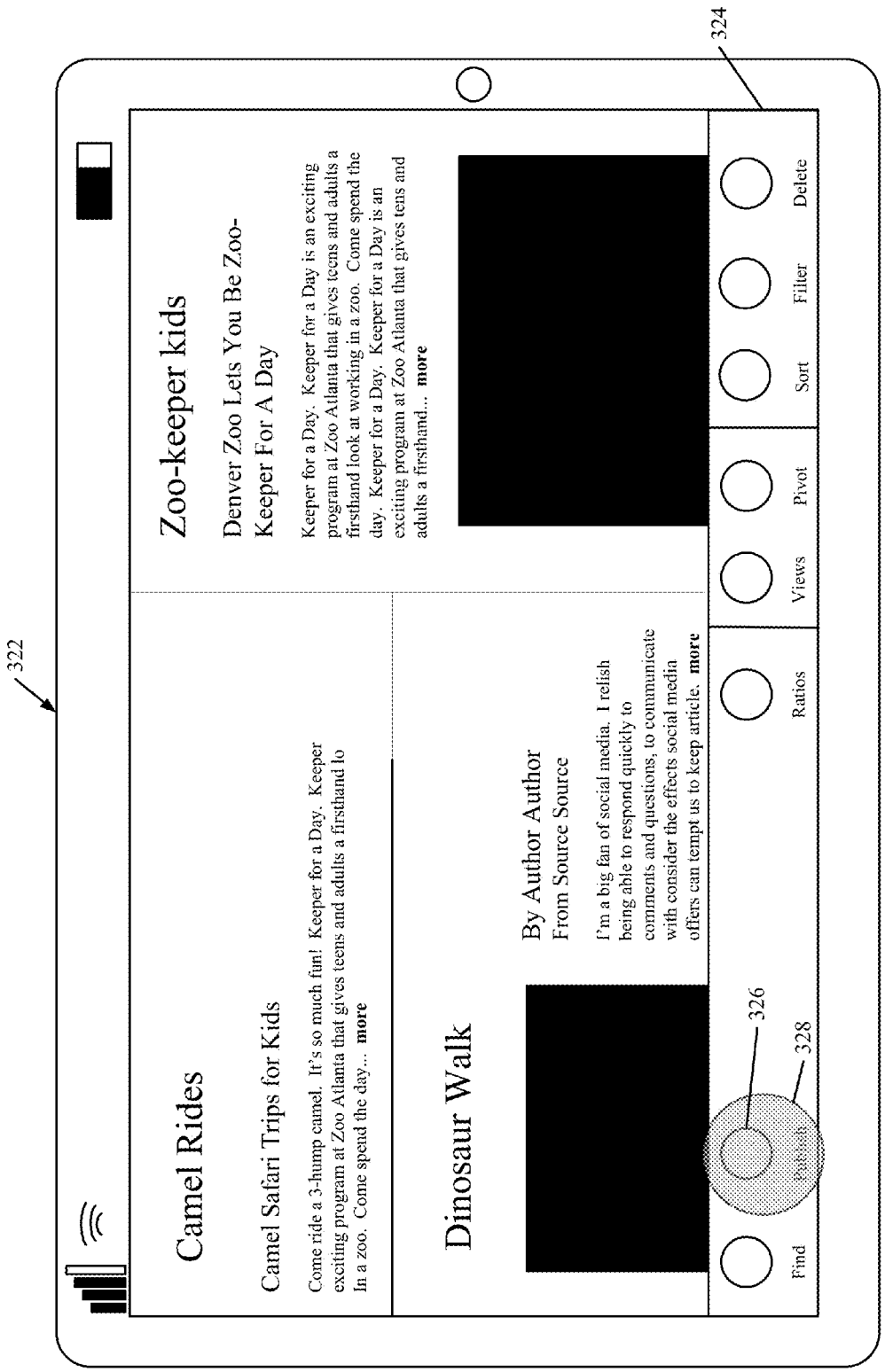
Figure 3J:
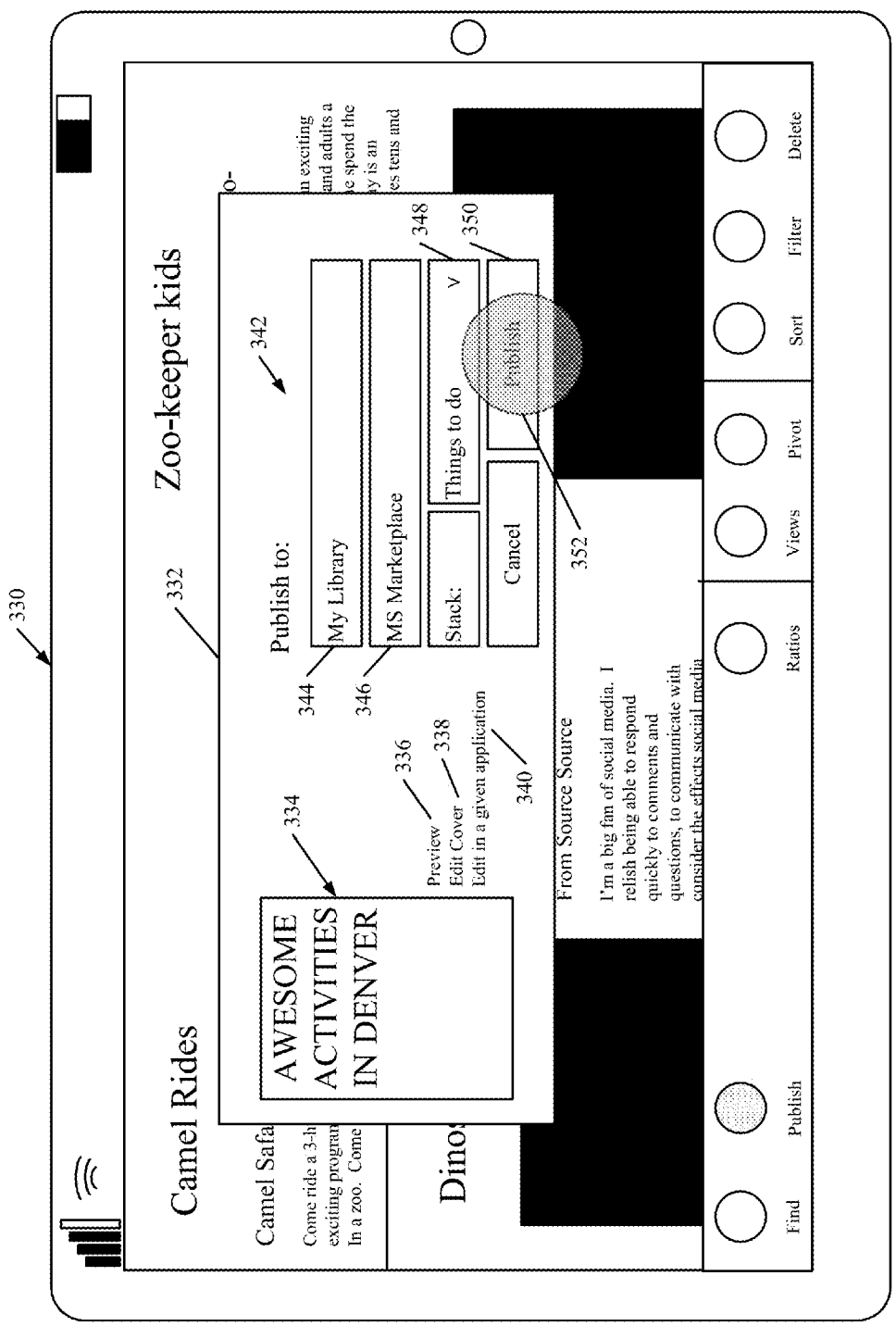

Referring again to FIG. 2, the user 104, at any time, can invoke a task bar that allows the user to publish or share the stack. Determining whether to publish or share the stack is indicated by block 320 in FIG. 2. FIG. 3I shows a user interface display 322 that allows the user to do this. FIG. 3I shows that the user has invoked a task bar 324 that includes a publish button 326. When the user actuates the publish button 326 (such as by placing cursor 328 over button 326 or tapping button 326 if touch gestures are enabled) publishing component 150 (shown in FIG. 1) generates a user interface display 330 shown in FIG. 3J.

User interface display 330 is similar to user interface display 322 shown in FIG. 3I, and similar items are similarly numbered. However, user interface display 330 includes a pop up menu 332. Pop-up display 332 illustratively includes a user actuatable input element 334 that represents the stack. In the embodiment shown in FIG. 3J, element 334 is shown as a book. The user can open the book by actuating it. The user can have a preview display by actuating button 336 or edit the cover of the book by actuating button 338. In addition, the user can edit the book in a given application by actuating button 340.

Pop-up display 332 also illustratively includes a "publish to" section 342. This allows user 104 to identify a location where the book 334 is to be published. For instance, user 104 can illustratively publish the book to his/her personal library indicated in textbox 344, or to a marketplace 112 as indicated in block 346. The user can publish their stack or collection as a digital or physical book, magazine, website, document, application, video, or otherwise. The user can publish it to another stack indicated by block 348 that allows the user to identify the particular stack using a dropdown menu 348. The user can then actuate publish button 350 in order to actually publish the stack (e.g., the electronic book 334). The user can do this by placing a cursor 352 over the publish button and actuating the button, or by actuating the button using touch gestures, etc. Displaying the pop-up display 332 to receive the user input indicating a destination for the publication is indicated by block 354 in FIG. 2.

Figure 3K:
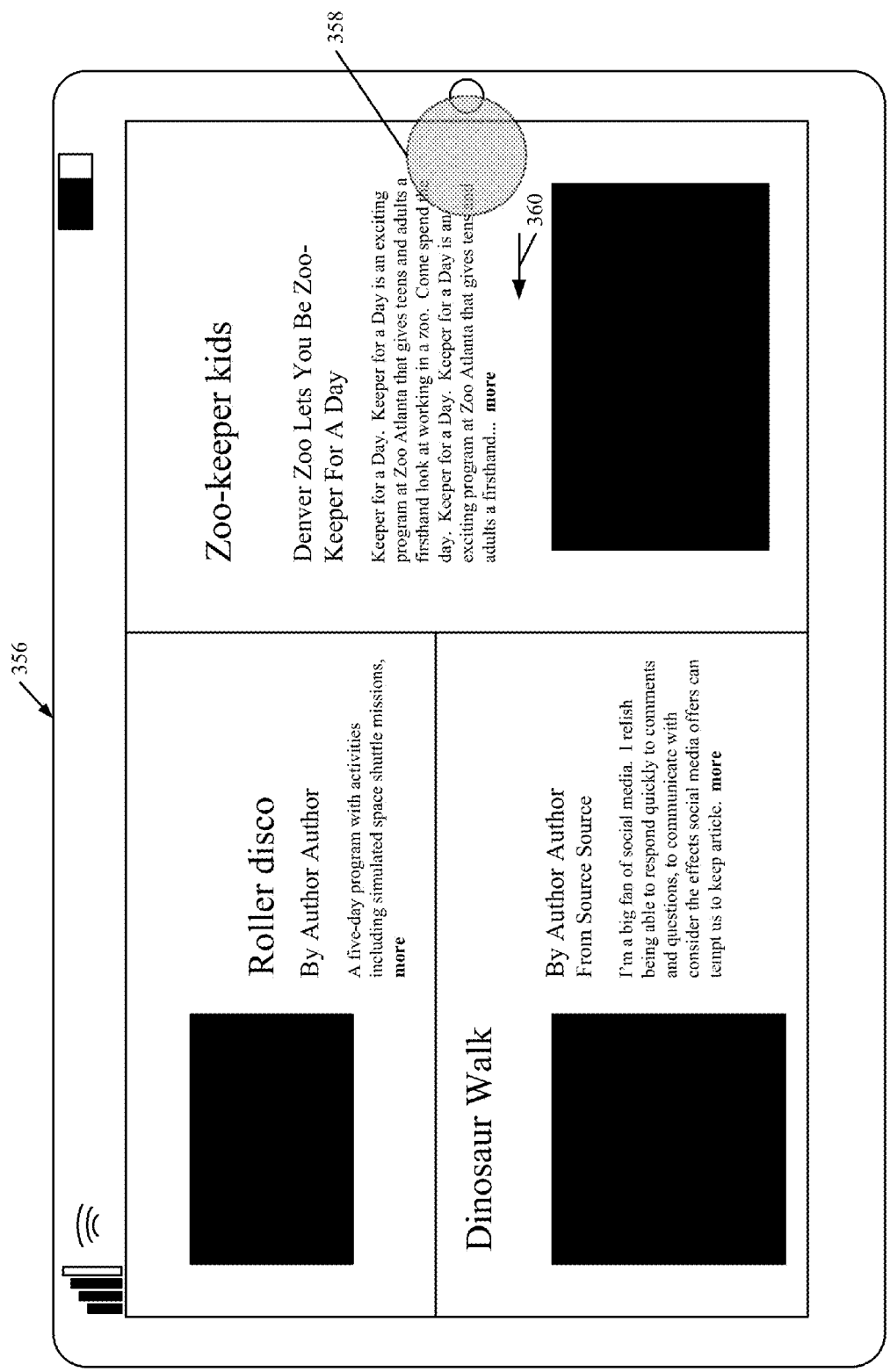

In addition, instead of publishing the stack as an electronic book or in another form, the user can simply share the stack as well. For instance, FIG. 3K shows a user interface display 356 displaying a stack in a magazine form. The user can actuate a user input mechanism on the display in order to invoke a task bar that allows the user to share the stack. If the screen is a touch sensitive screen and the user places his/her finger on the right side of the screen as indicated by circle 358 and swipes to the left in the direction indicated by arrow 360, this can invoke a share pane, such as pane 362 shown in FIG. 3L (it can be invoked in other ways as well). The share pane 362 provides a plurality of different user input mechanisms which can be actuated to select a destination where the user wishes the stack to be shared.

Figure 3L:
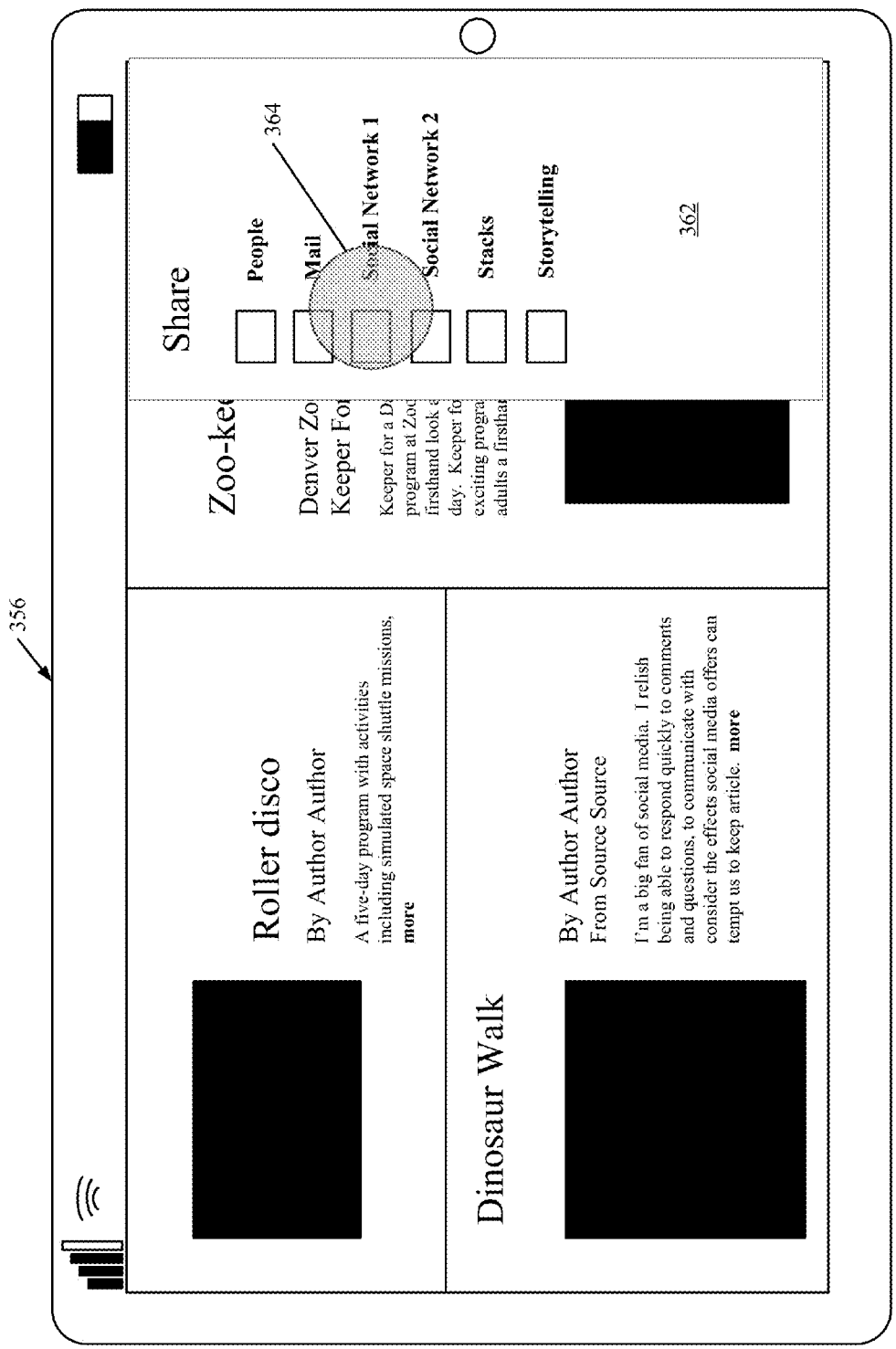
Figure 3M:
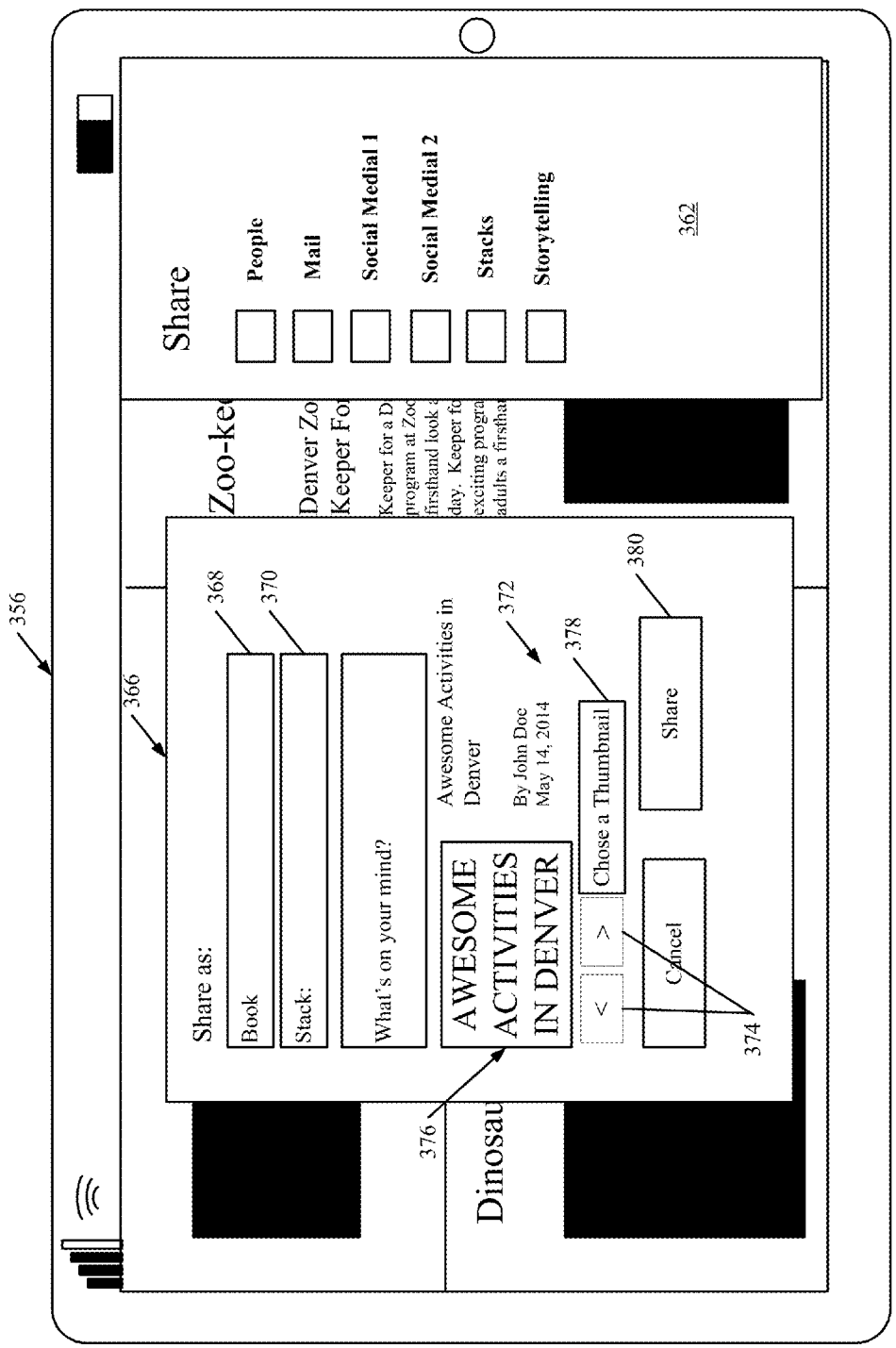

In the embodiment shown in FIG. 3L, the user is actuating the user input mechanism corresponding to social network 1. The user can do this by tapping that user input mechanism or placing a cursor (indicated by circle 364) over the user input mechanism and actuating it, etc. When the user does this, publishing component 150 illustratively generates another pop-up display such as display 366 shown in FIG. 3M.

Display 366 allows the user to indicate the type of format that the stack is to be shared in, such as by selecting it from (or typing it into) box 368. The user can identify the particular stack in box 370, and choose a thumbnail representing the stack to be shared by using user input mechanism 372. The user can also choose a series of different thumbnails. Thumbnail previews can show different sizes and aspect ratios, previews or give the option to have a dynamic tile or slideshow thumbnail that rotates through multiple thumbnails. The user can scroll through different thumbnail representations using arrows 374, when they are displayed in thumbnail display section 376. When the user locates a desired thumbnail to represent the stack being shared, the user can illustratively actuate button 378 to select that thumbnail representation. Then, the user can share the stack by actuating button 380. When this occurs, publishing component 150 illustratively shares the stack out to the destination selected in pane 362.

Referring again to FIG. 2B, it will be noted that the user can indicate that the stack is to be published out or shared with individuals 382, with various websites 384, to the user's personal library 386, to one or more various social networks 388 or to other destinations 390 as well.

Displaying the user interface to receive the user input indicating the particular format of the publication or stack to be shared is indicated by block 392. The user can illustratively choose the stack to be shared as a book 394, as a magazine 396, simply as a stack (such as a list of tiles) 398, as a webpage 400, or in another format 402.

Figure 3N:
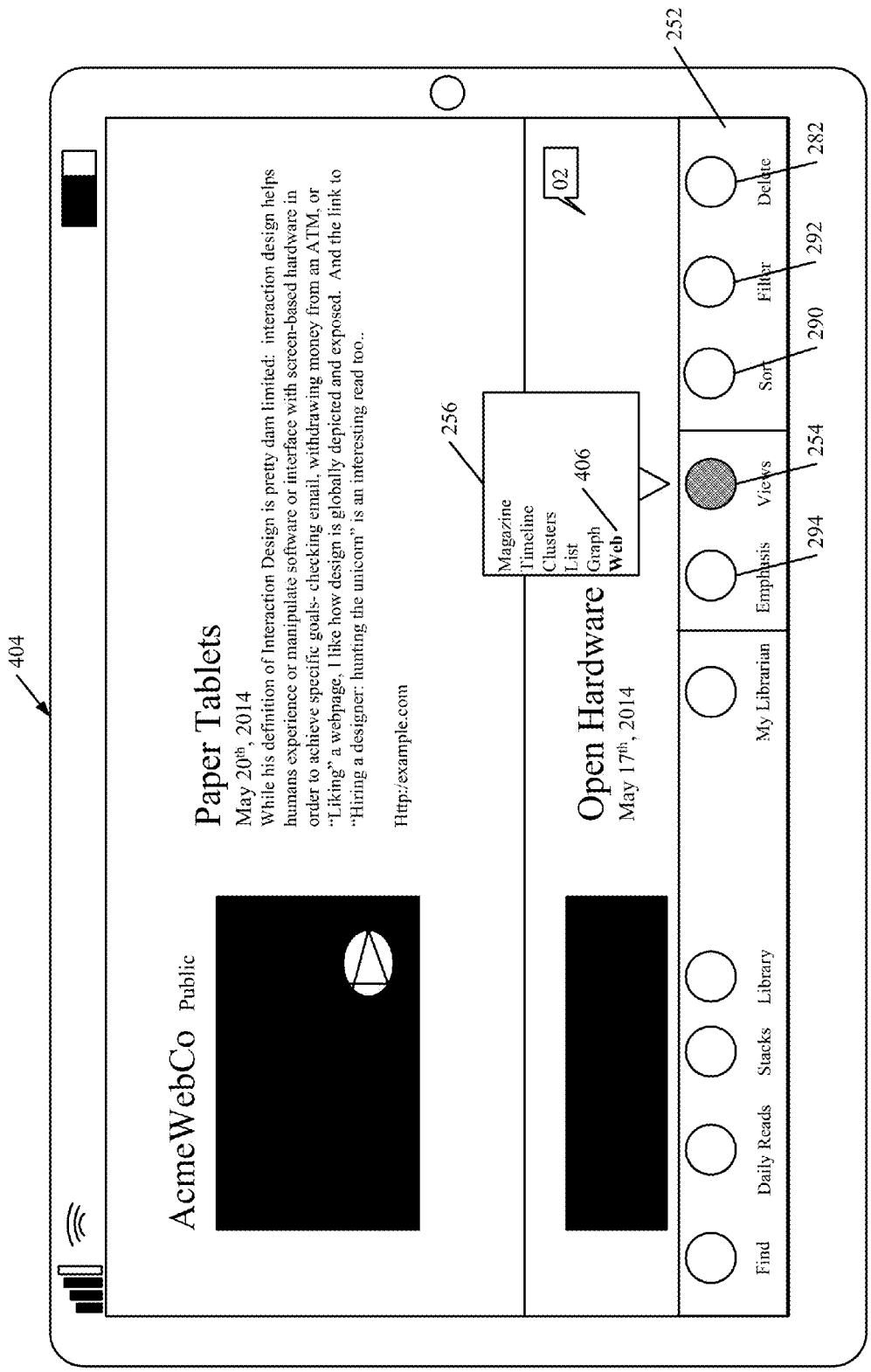
Figure 3O:
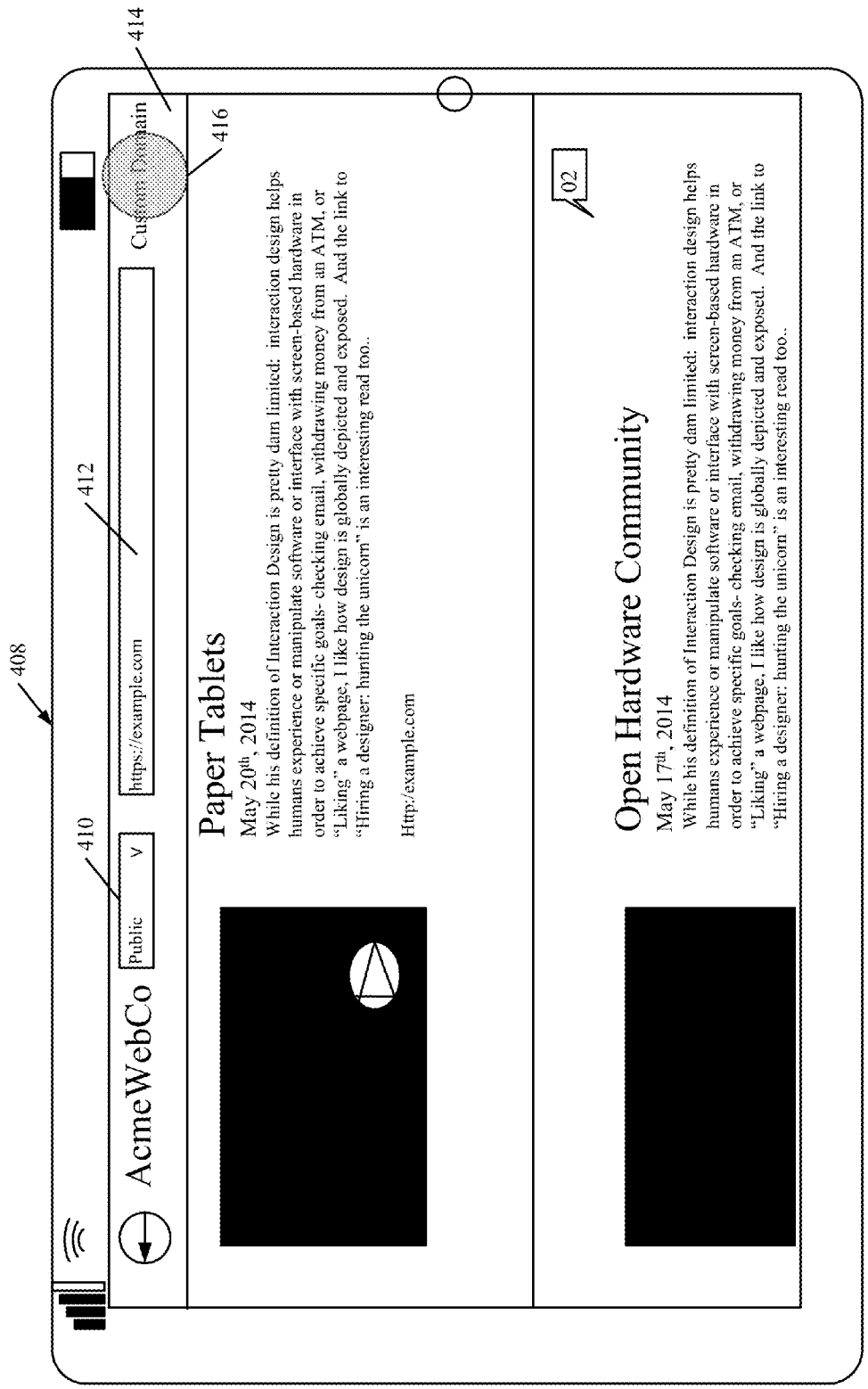

In one embodiment, content collection system 102 also allows user 104 to purchase and customize a domain name when the stack is to be published out as a webpage (or accessed through a webpage). By way of example, display generator 152 illustratively generates a display, such as display 404 shown in FIG. 3N. The user interface display 404 shows that the user has actuated views button 254 so that pop-up menu 256 is displayed. FIG. 3N also shows that the user has selected to view the stack as a webpage by selecting web actuator 406 from pop-up display 256. This causes the stack to be displayed as a webpage (e.g., a scrolling blog-style format or in other layouts), such as is shown in user interface display 408 in FIG. 3O.

User interface display 408 allows the user to make the webpage public or private by selecting from a dropdown menu actuator 410. It also illustrates the URL assigned to the stack in box 412. User interface display 408 also allows the user to associate a custom domain name with the URL by actuating user input mechanism 414. This can be done, again, by placing cursor 416 over button 414 and actuating it, by actuating it using a touch gesture or otherwise. The user actuates custom domain actuator 414, domain name manager 162 (from FIG. 1) illustratively generates a pop-up display, such as display 418 shown in FIG. 3P.

Figure 3P:
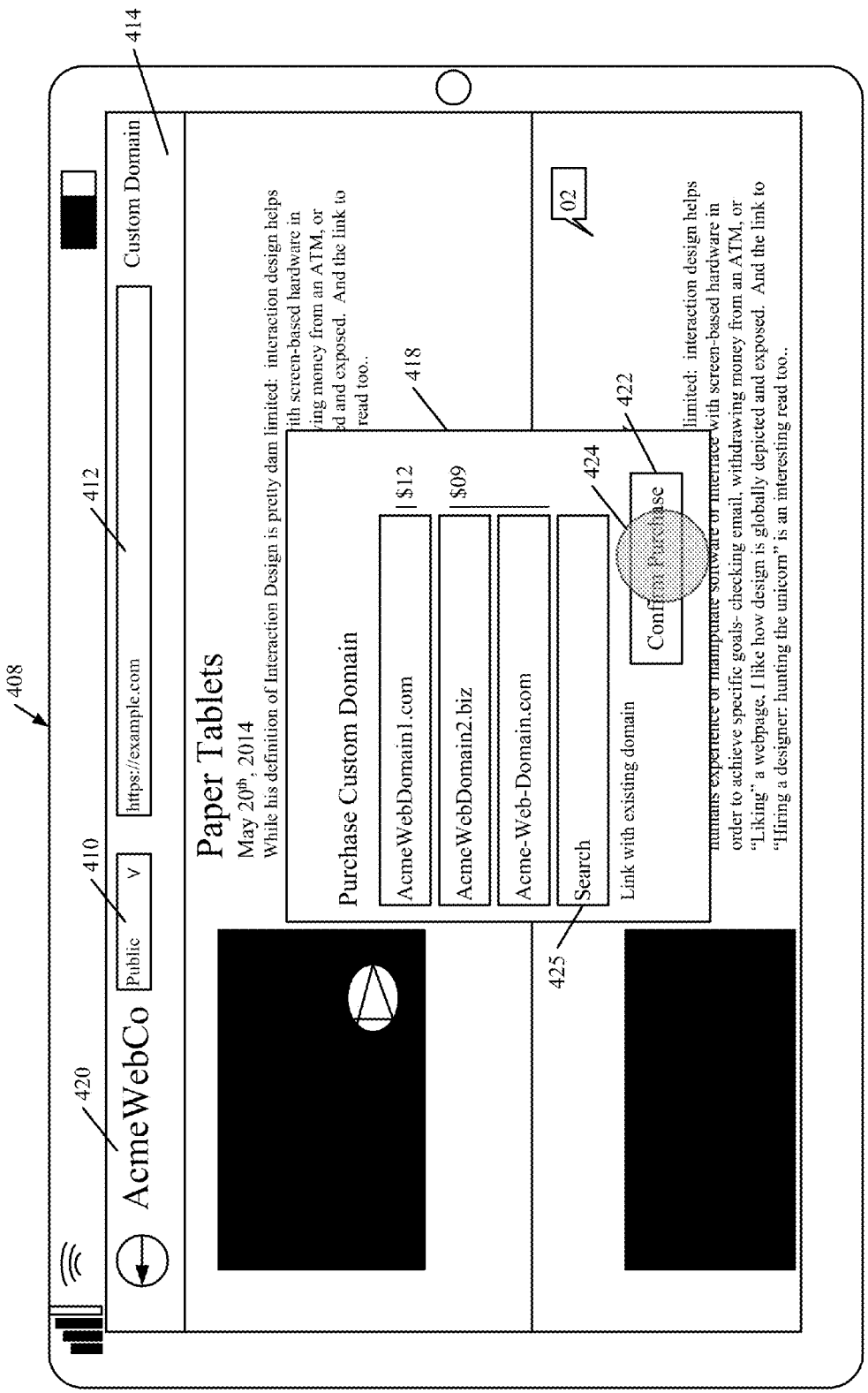

FIG. 3P shows that, in one embodiment, domain name manager 162 automatically generates several available options based on the stack name assigned and illustrated at 420. In the embodiment shown in FIG. 3P, domain name manager 162 has identified both the availability, and price for purchasing, three different custom domain names that are related linguistically to the stack name shown at 420. By selecting any of the options, and actuating the confirm purchase button 422, the domain name manager 160 automatically purchases the selected domain name and associates it with the URL displayed in box 412. The user can again do this by placing cursor 424 over button 422 and actuating it, by actuating it in other ways (such as using touch gestures), etc. Determining that the user wishes to customize the domain name is indicated by block 426 in FIG. 2, and displaying the UI showing the options and receiving a selection to purchase a domain name is indicated by block 428. In doing so, domain name manager 162 can show available suggestions or options as indicated by block 430, it can display prices as indicated by block 432, it can receive a user input name as a search request as indicated by block 434, or it can receive the user display items and to receive the user selection in other ways as indicated by block 436.

If the user does not like any of the options automatically selected by domain name manager 162, the user can illustratively type in a desired name and have domain name manager 162 search for its availability, or actuate search button 425. When that occurs, domain name manager 162 navigates the user to a domain name search interface where the user can find, select and purchase a desired domain name.

Figure 3Q:
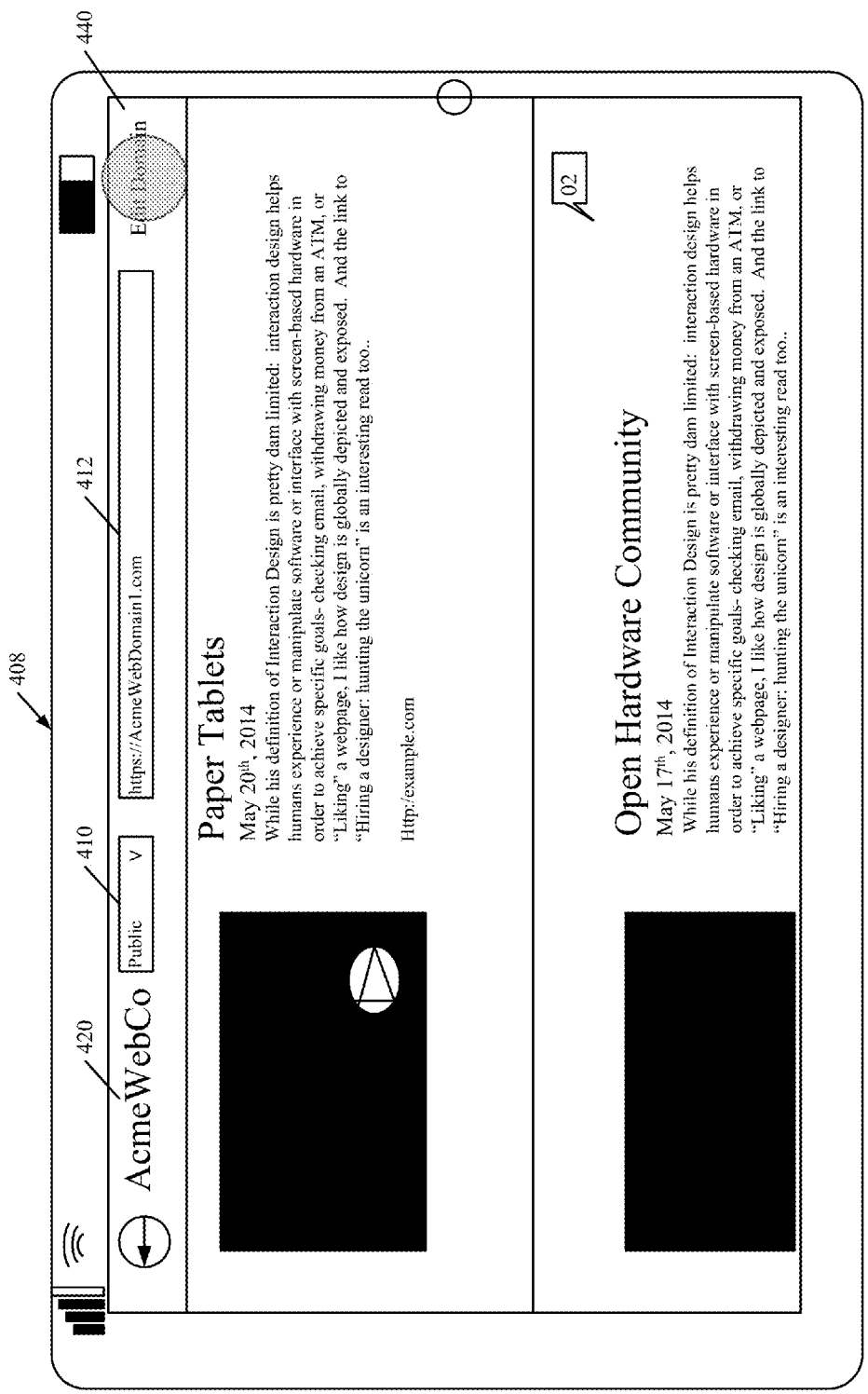
Figure 3R:
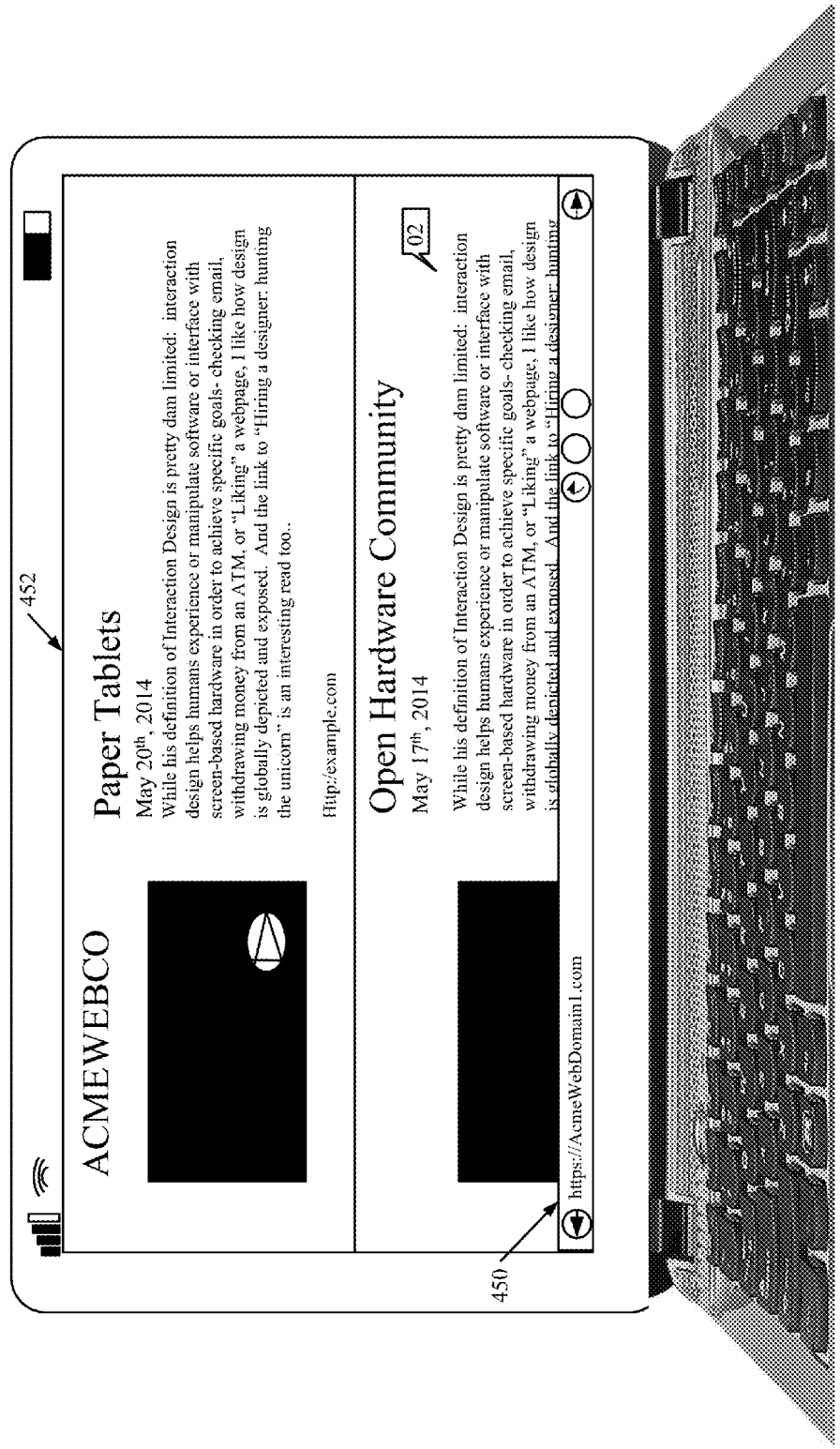

When the user actuates the confirm purchase button 422, the newly purchased domain name is associated with the URL shown in box 412. FIG. 3Q shows the interface display that indicates this. It can be seen that the purchased domain name (in this case AcmeWeb Domain1.com) is now displayed in box 412, instead of the original URL. FIG. 3Q also shows that an edit domain button 440 can be displayed which, when actuated by the user, allows the user to edit the domain name further.

When the stack is published as a webpage, FIG. 3R shows a user interface display indicating that anyone can then view the stack on the webpage by going to the custom domain name. In the embodiment shown in FIG. 3R, the user has pointed the browser to the custom web domain as shown in box 450. This navigates the user to the stack and it is displayed as a scrollable blog-style webpage in user interface display 452. Publishing the stack is indicated by block 454 in FIG. 2.

Figure 4:
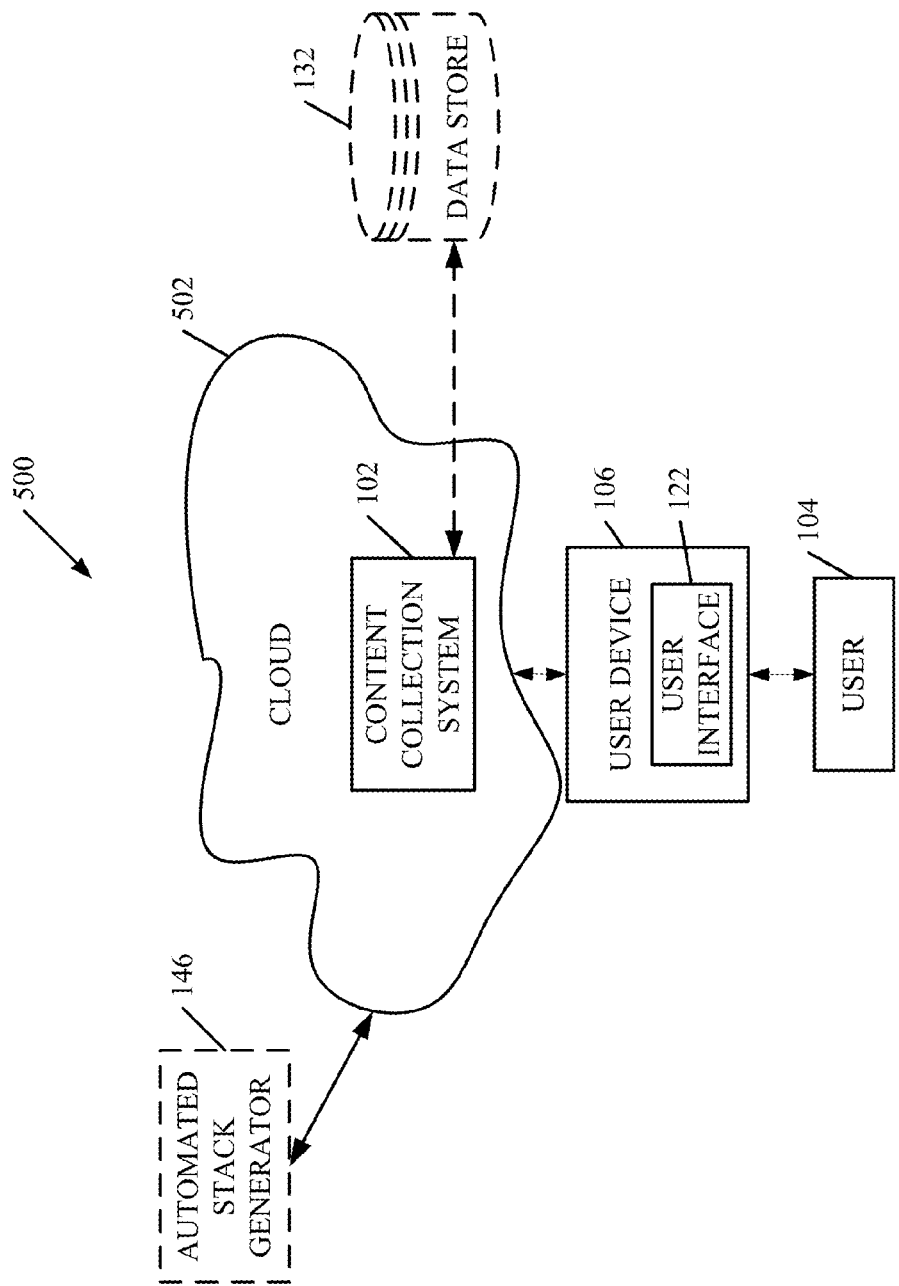
FIG. 4 shows the architecture of FIG. 1 deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that content collection system 102 is located in cloud 502 (which can be public, private, or a combination where portions are public while others are private). Therefore, user 104 uses a user device 106 to access those systems through cloud 502.

FIG. 4 also depicts another embodiment of a cloud architecture. FIG. 4 shows that it is also contemplated that some elements of system 102 are disposed in cloud 502 while others are not. By way of example, data store 132 can be disposed outside of cloud 502, and accessed through cloud 502. In another embodiment, automated stack generator 146 is also outside of cloud 502. Regardless of where they are located, they can be accessed directly by device 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
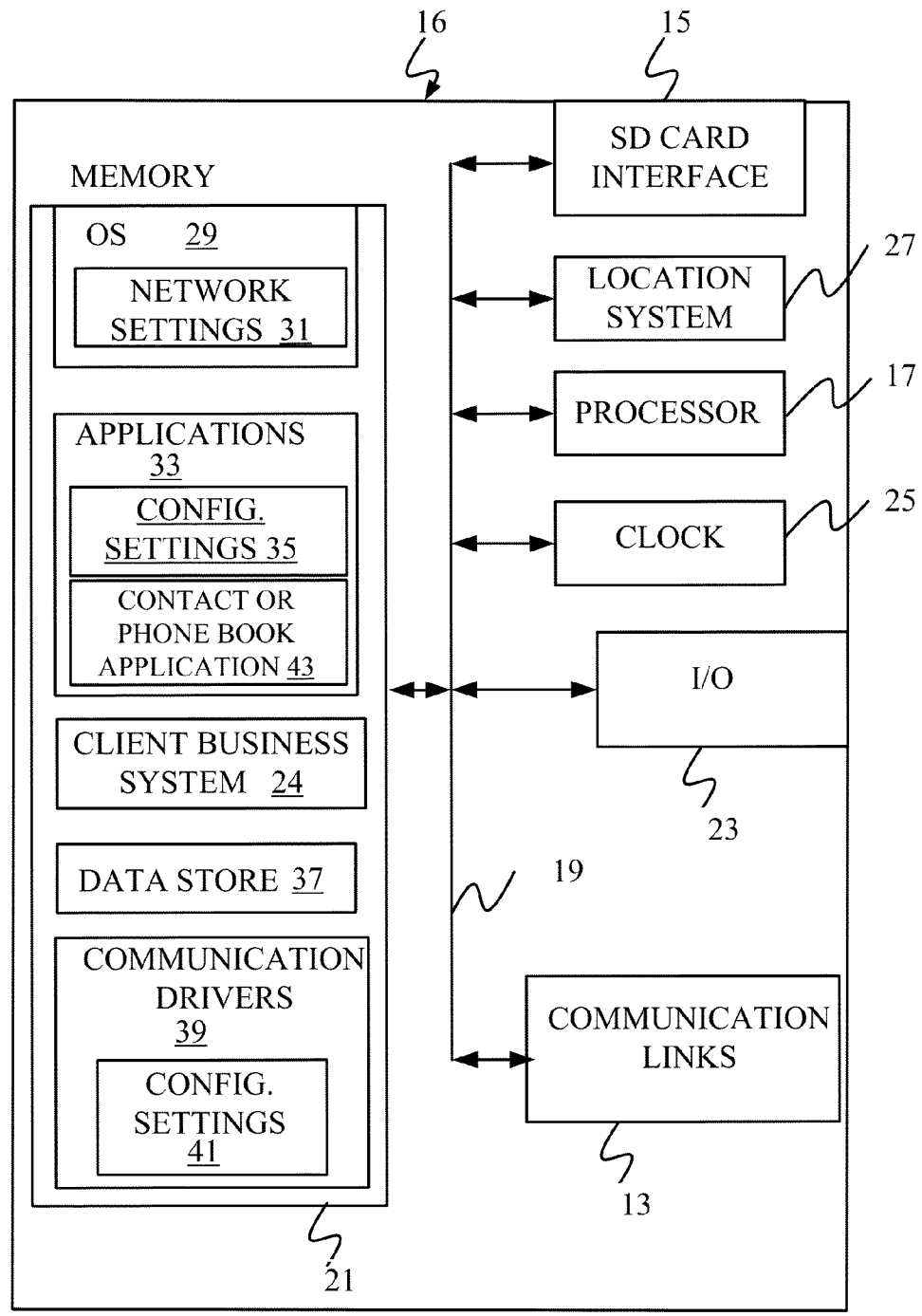
FIGS. 5-10 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-10 are examples of handheld or mobile devices.

FIG. 5 provides a general block diagram of the components of a client device 16 that can run components of system 102 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like a client portion of system 100) are received on a removable Secure Digital (SD) card that is connected to a SD card interface 15. SD card interface 15 and communication links 13 communicate with a processor 17 (which can also embody processors 130 or 144 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. The items in data store 132, for example, can reside in memory 21. Similarly, device 16 can have a client business system 24 which can run various business applications or embody parts or all of user device 106. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
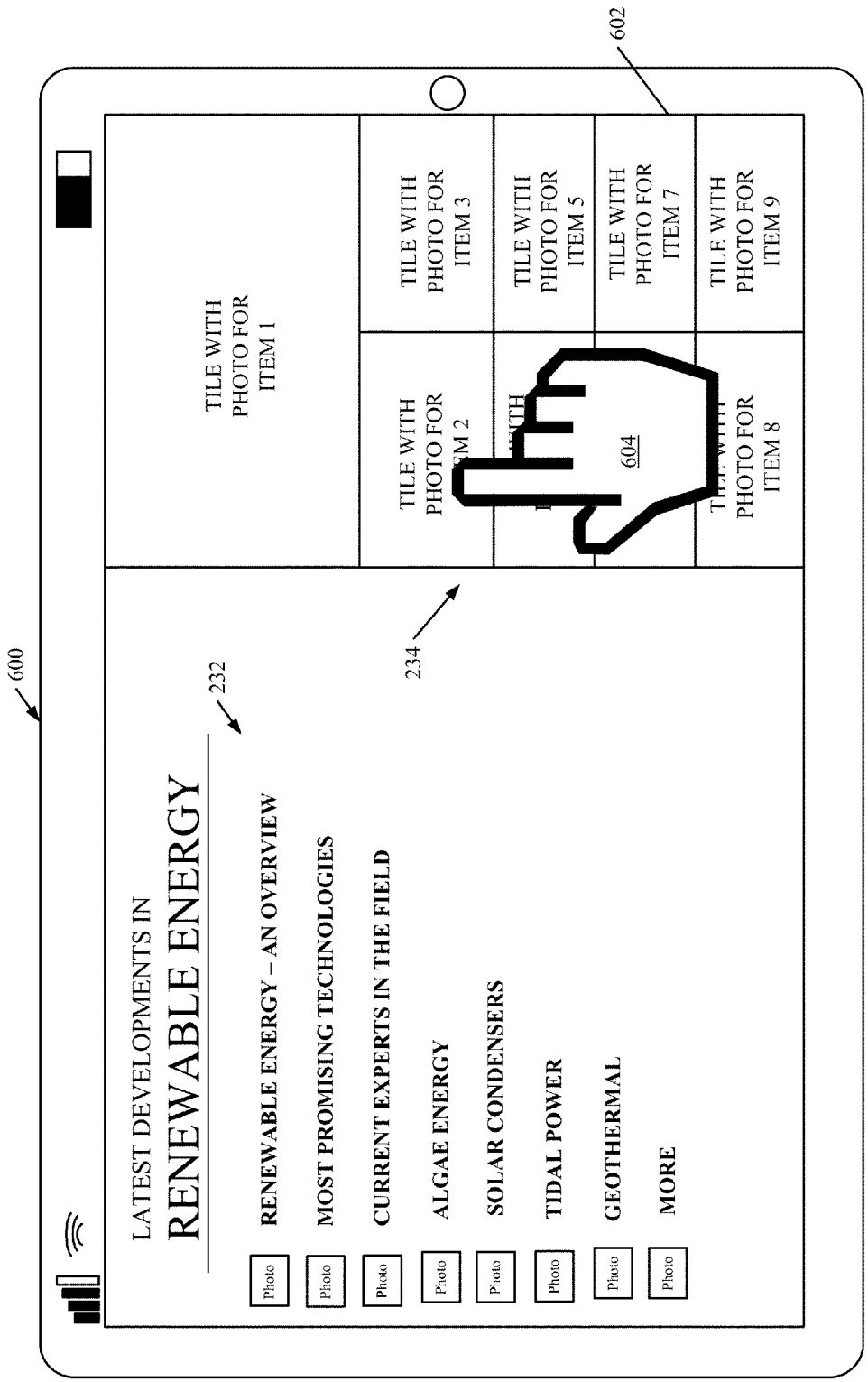

FIG. 6 shows one embodiment in which device 16 is a tablet computer 600. In FIG. 6, computer 600 is shown with the user interface display (from FIG. 3A-2) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
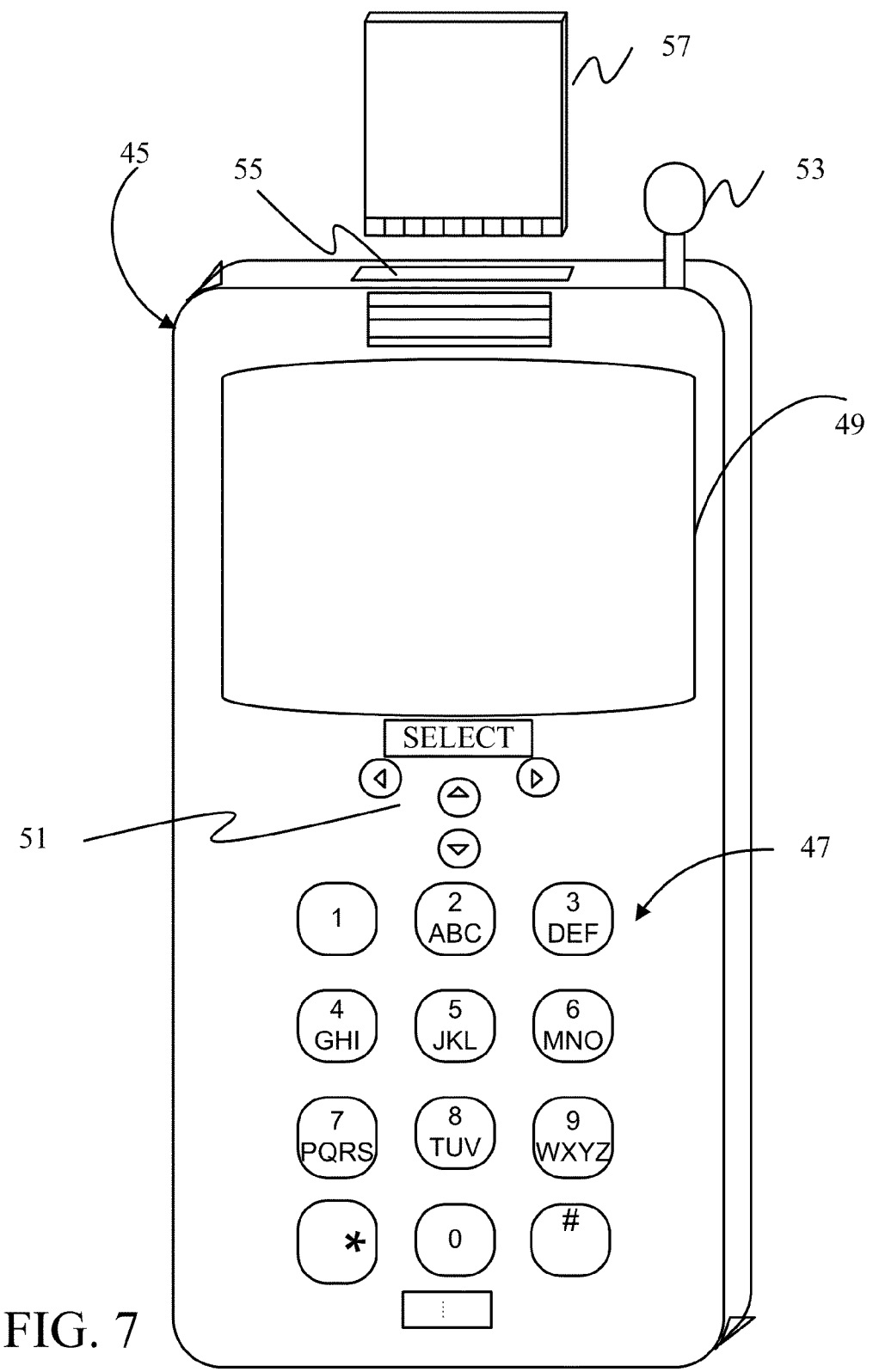
Figure 8:
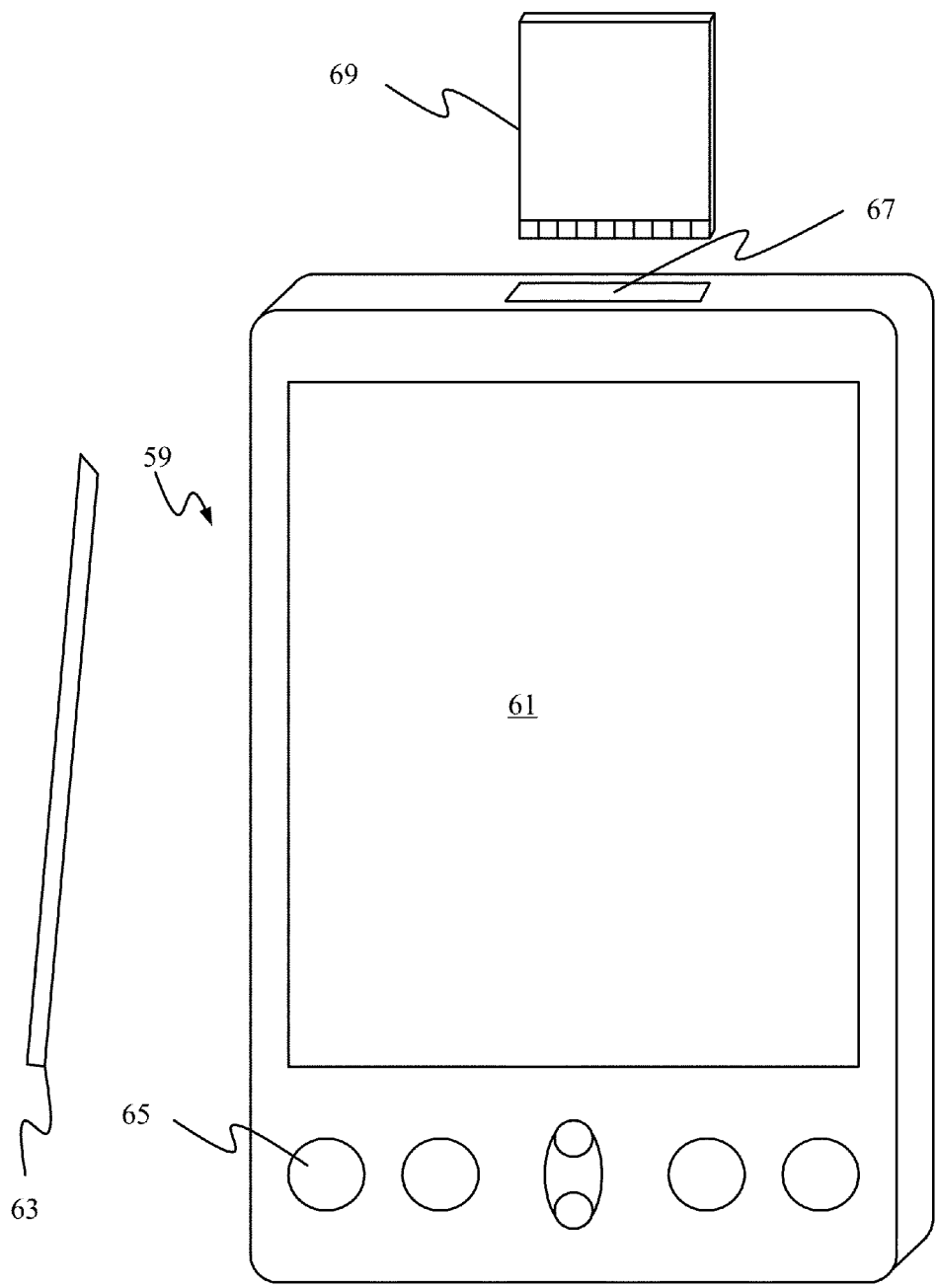

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
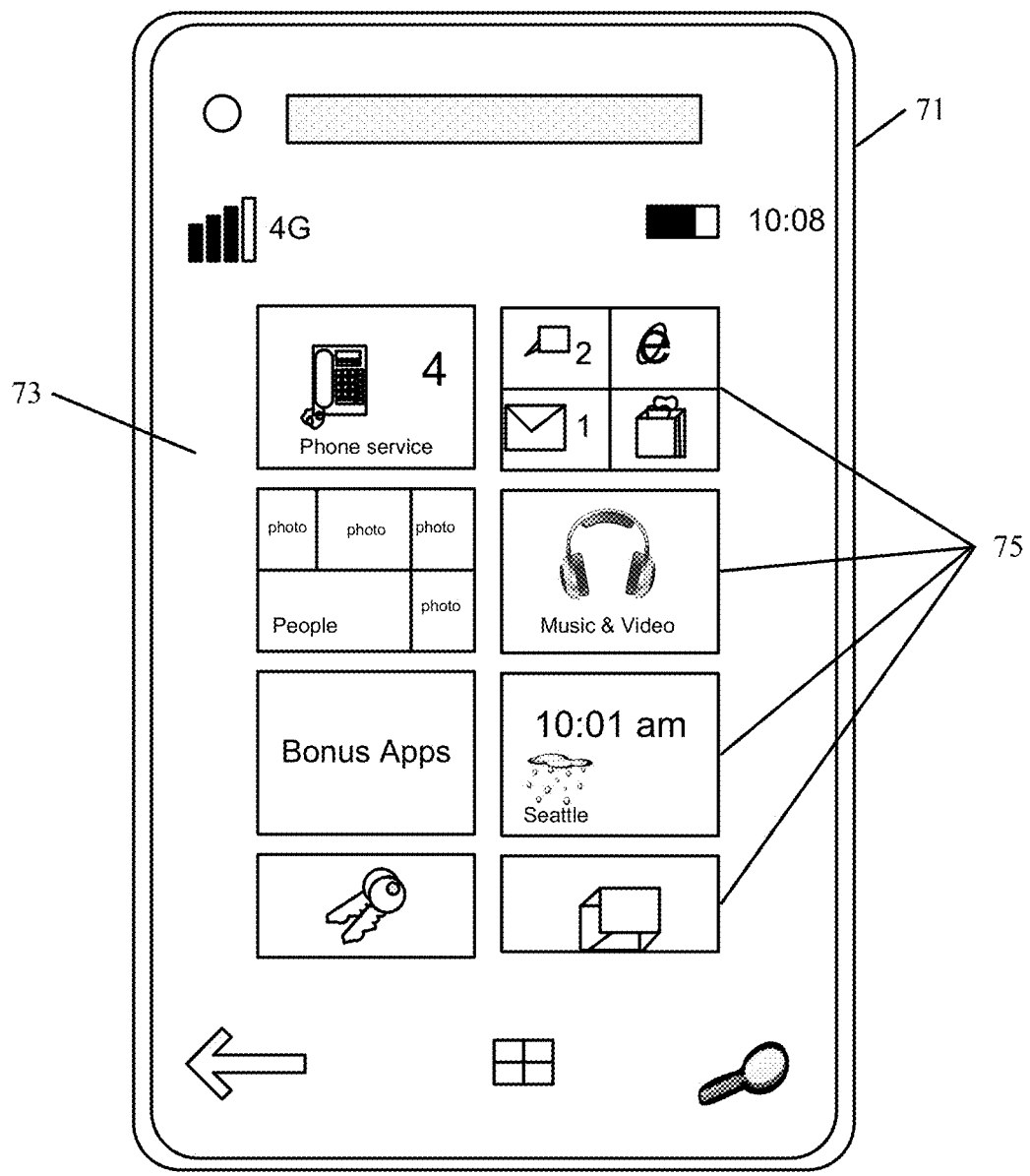
Figure 10:
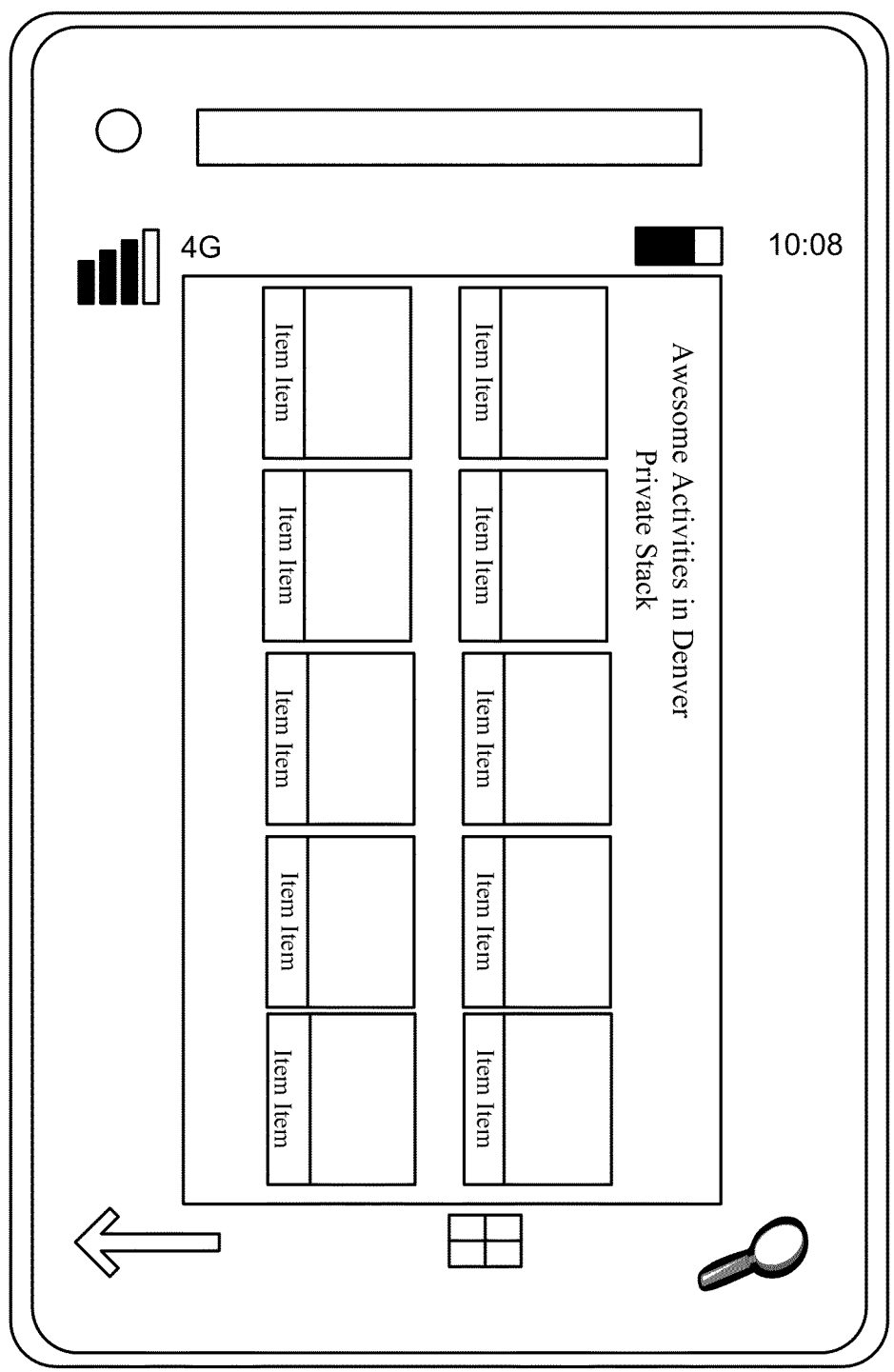

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows smart phone 71 with the user interface display of FIG. 3B displayed on it.

Note that other forms of the devices 16 are possible.

Figure 11:
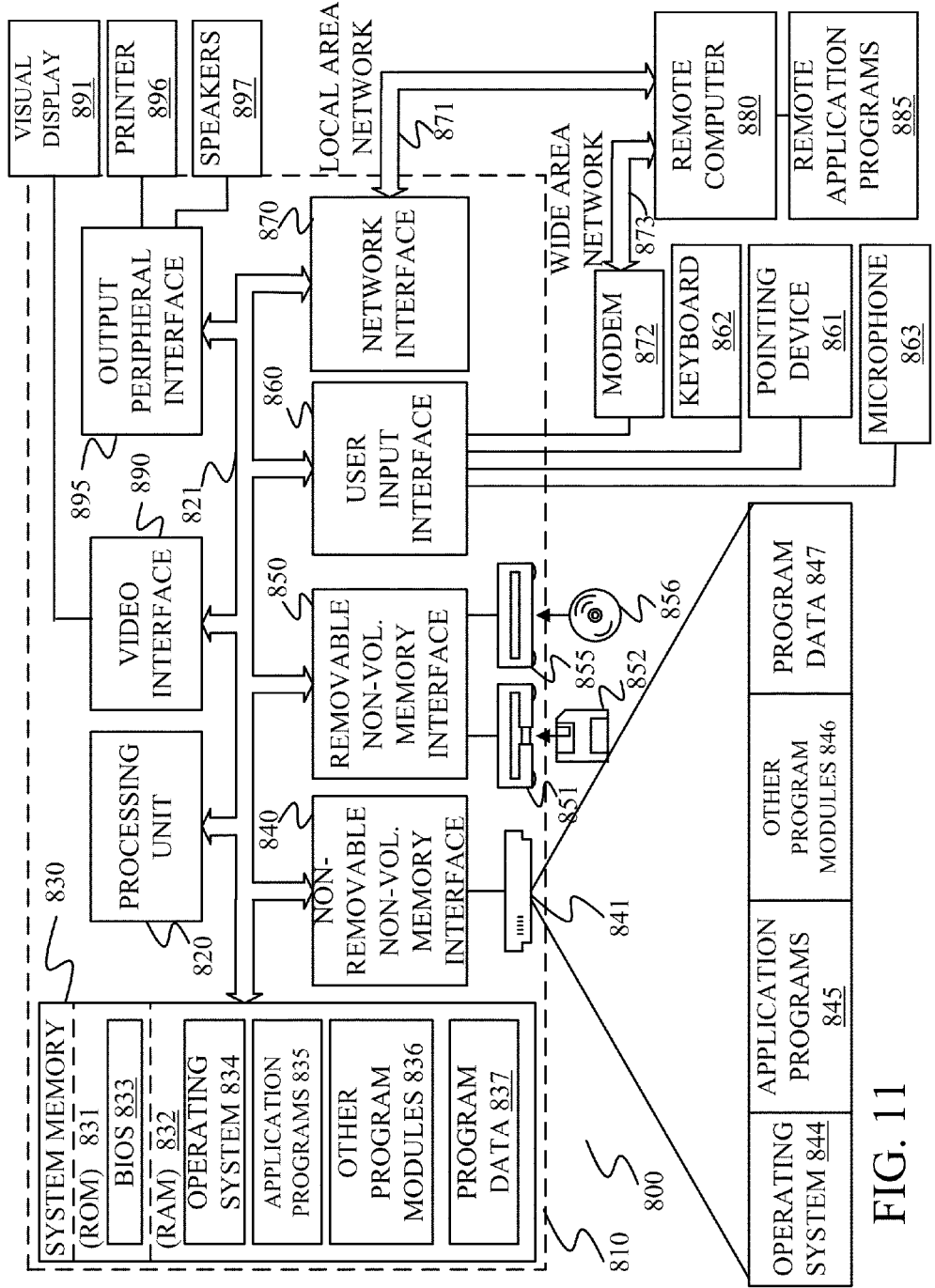
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 130 or 144), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of identifying content for a collection, comprising:
    displaying a user interface to receive a natural language user input indicative of a subject of the collection;
    automatically accessing user profile information corresponding to a user;
    causing an automated stack generator to use a search engine to identify items of content from a plurality of remote sources of digital media based on the natural language search user input, the user information and a defined time period within which the collection is to be created; and
    adding the identified items of content to a collection, having a given format, for review within the defined period.

2. The computer-implemented method of claim 1 and further comprising:
    automatically generating a table of contents for the identified items of content in the collection; and
    displaying the table of contents.

3. The computer-implemented method of claim 2 wherein adding the identified items of content to a collection comprises:
    formatting the identified items of content as a digital hook; and
    displaying a user actuatable input mechanism corresponding to the digital book, actuatable by the user to view the identified items of content in the digital book.

4. The computer-implemented method of claim 1 wherein adding the identified items of content to a collection comprises:
    formatting the identified items of content as a list of tiles, each tile corresponding to an identified item of content, each tile being actuatable to view the corresponding identified item of content; and
    displaying the list of tiles.

5. The computer-implemented method of claim 1 wherein adding the identified items of content to a collection comprises:
    formatting the identified items of content as a list of user actuatable elements arranged along a timeline, each user actuatable element corresponding to one of the identified items of content, and being arranged along the timeline based on a date of authorship of the identified items of content, each user actuatable element being actuatable to view the corresponding identified item of content; and
displaying the list of user actuatable elements arranged along the timeline.

6. The computer-implemented method of claim 1 wherein the defined time period is specified in the natural language user input.

7. The computer-implemented method of claim 6 and further comprising:
displaying a domain customization user interface display to receive a domain customization user input to customize a domain name corresponding to the webpage.

8. The computer-implemented method of claim 7 wherein displaying a domain customization user interface display comprises:
receiving a name user input indicative of a name of the collection; and
displaying available domain names identified based on the name of the collection.

9. The computer-implemented method of claim 8 and further comprising:
receiving a user selection input selecting a given one of the available domain names; and
automatically purchasing the given domain name and customizing the domain name corresponding to the webpage with the given domain name.

10. The computer-implemented method of claim 1 wherein adding the identified items of content to the collection, comprises:
arranging the identified items of content according to a predetermined order; and
adding the identified items of content to the collection in the predetermined order.

11. The computer-implemented method of claim 10 wherein arranging the identified items of content comprises:
performing natural language understanding analysis on the identified items of content to identify a subject matter difficulty of each of the identified items of content; and
arranging the identified items of content according to the subject matter difficulty of each of the identified items of content.

12. The computer-implemented method of claim 10 wherein arranging the identified items of content comprises:
performing natural language understanding analysis on the identified items of content to identify a concept progression reflected in the identified items of content; and
arranging the identified items of content according to the concept progression identified in the identified items of content.

13. The computer-implemented method of claim 1 wherein identifying the items of content comprises:
accessing the user information to identify a reading level of the user; and
identifying the items of content based on the reading level.

14. The computer-implemented method of claim 1 wherein identifying the items of content comprises:
receiving a user consumption time input indicative of a target consumption time;
identifying the target consumption time for the identified items of content; and
filtering the items of identified content based on the identified consumption times for each identified item of content and the target consumption time.

15. A content collection system, comprising:
an automated stack generator configured to display a user interface to receive a search user input indicative of a subject of a collection of content and a timing input within which generation of the collection of content must be completed, access user information corresponding to a user, automatically identify items of content from a plurality of remote resources based on the search user input, the timing input, and the user information, and add the identified items of content to a collection, having a given format, for review within a time limit defined by the timing input; and
a display generator that generates a display that displays the collection in the given lot mat.

16. The content collection system of claim 15 and further comprising:
a publishing component that publishes the collection in the given format to a user-selectable publication destination.

17. The content collection system of claim 16 and further comprising:
a natural language understanding (NLU) component that analyzes the identified items of content to obtain an analysis result; and
a sorting component that sorts the identified items of content into an order for presentation in the collection based on the analysis result from the NLU component.

18. A computer-implemented method, comprising:
displaying a query user interface to receive a natural language user input indicative of a subject of the collection;
accessing user information corresponding to a user;
receiving a timing input that defines a time period within which the content will be generated;
automatically identifying items of content from a plurality of remote resources based on the natural language user input, the user information and the timing input;
adding the identified items of content to a collection, having a given format, for review within the time period.

19. The computer-implemented method of claim 18 and further comprising:
receiving a user consumption time input indicative of a time limit of consumption;
identifying a consumption time for the identified items of content; and
prioritizing the identified items of content based on the identified consumption time for each identified item of content and the time limit of consumption.

20. The computer-implemented method of claim 18, and further comprising a share user input that identifies a social network site as a destination to share the collection, and wherein sharing the collection comprises:
sharing the collection, in the given format, to the social network site.

* * * * *